(12) United States Patent
Yao et al.

(10) Patent No.: US 10,998,553 B1
(45) Date of Patent: May 4, 2021

(54) ELECTROCHEMICAL CELL WITH INTEGRATED CERAMIC SEPARATOR

(71) Applicant: EnPower, Inc., Phoenix, AZ (US)

(72) Inventors: Adrian Yao, Phoenix, AZ (US); Jonathan Hwang, Phoenix, AZ (US); Mayuresh Keskar, Scottsdale, AZ (US); Raymundo Roig, Phoenix, AZ (US)

(73) Assignee: EnPower, Inc., Phoenix, AZ (US)

( * ) Notice: Subject to any disclaimer, the term of this patent is extended or adjusted under 35 U.S.C. 154(b) by 0 days.

(21) Appl. No.: 16/727,787

(22) Filed: Dec. 26, 2019

Related U.S. Application Data

(60) Provisional application No. 62/928,975, filed on Oct. 31, 2019.

(51) Int. Cl.
| | |
|---|---|
| *H01M 4/66* | (2006.01) |
| *H01M 50/44* | (2021.01) |
| *H01M 50/46* | (2021.01) |
| *H01M 50/411* | (2021.01) |
| *H01M 50/431* | (2021.01) |
| *H01M 4/02* | (2006.01) |

(52) U.S. Cl.
CPC ......... *H01M 4/664* (2013.01); *H01M 50/411* (2021.01); *H01M 50/431* (2021.01); *H01M 50/44* (2021.01); *H01M 50/46* (2021.01); *H01M 2004/027* (2013.01); *H01M 2004/028* (2013.01)

(58) Field of Classification Search
CPC ............................ H01M 4/664; H01M 2/1673
See application file for complete search history.

(56) References Cited

U.S. PATENT DOCUMENTS

| | | | |
|---|---|---|---|
| 5,824,120 | A | 10/1998 | Mitchell et al. |
| 5,873,523 | A | 2/1999 | Gomez et al. |
| 7,348,101 | B2 | 3/2008 | Gozdz et al. |
| 7,682,740 | B2 | 3/2010 | Yong et al. |
| 7,745,048 | B2 | 6/2010 | Hwang et al. |
| 7,781,098 | B2 | 8/2010 | Chiang et al. |

(Continued)

FOREIGN PATENT DOCUMENTS

| | | |
|---|---|---|
| JP | 2016-207258 A | 12/2016 |
| JP | 6354420 B2 | 7/2018 |

(Continued)

*Primary Examiner* — Ula C Ruddock
*Assistant Examiner* — Thomas H. Parsons
(74) *Attorney, Agent, or Firm* — Kolitch Romano LLP

(57) ABSTRACT

An electrochemical cell including a positive electrode (e.g., a cathode) and a negative electrode (e.g., an anode), at least one of which includes an integrated ceramic separator. An integrated ceramic separator may include a plurality of ceramic particles. In some examples, an interlocking region may be disposed between the integrated ceramic separator layer and a corresponding electrode layer, the region including a non-planar boundary between the two layers. In some examples, the electrochemical cell includes a polyolefin separator disposed between the positive electrode and the negative electrode. In some examples, both the positive electrode and the negative electrode include an integrated ceramic separator. In these examples, the positive electrode and the negative electrode may be calendered together such that the integrated separator layers merge and become indistinguishable from each other.

14 Claims, 18 Drawing Sheets

(56) References Cited

U.S. PATENT DOCUMENTS

| | | | |
|---|---|---|---|
| 8,062,789 B2 | 11/2011 | Kim et al. | |
| 8,178,209 B2 | 5/2012 | Qi et al. | |
| 8,323,815 B2 | 12/2012 | Beard | |
| 8,361,663 B2 | 1/2013 | Kang et al. | |
| 8,409,511 B2 | 4/2013 | Thomas et al. | |
| 8,570,736 B2 | 10/2013 | McClure et al. | |
| 8,591,604 B2 | 11/2013 | Berkowitz et al. | |
| 8,669,008 B2 | 3/2014 | Cho et al. | |
| 8,778,539 B2 | 7/2014 | Ohsawa et al. | |
| 8,951,669 B2 * | 2/2015 | Lee | H01M 4/622 |
| | | | 429/211 |
| 9,178,209 B2 | 11/2015 | Kim et al. | |
| 9,209,482 B2 | 12/2015 | Chu et al. | |
| 9,263,730 B2 | 2/2016 | Suzuki | |
| 9,543,568 B2 | 1/2017 | Sung et al. | |
| 9,564,369 B1 | 2/2017 | Kim et al. | |
| 9,564,639 B2 | 2/2017 | Huang | |
| 2002/0028380 A1 | 3/2002 | Tanjo et al. | |
| 2003/0054249 A1 | 3/2003 | Yamamoto et al. | |
| 2003/0099884 A1 | 5/2003 | Chiang et al. | |
| 2003/0129598 A1 | 7/2003 | Yang et al. | |
| 2003/0230532 A1 | 12/2003 | Rosenblatt et al. | |
| 2004/0131934 A1 | 7/2004 | Sugnaux et al. | |
| 2005/0236732 A1 | 10/2005 | Brosch et al. | |
| 2008/0044733 A1 * | 2/2008 | Ohata | H01M 4/621 |
| | | | 429/326 |
| 2008/0057401 A1 | 3/2008 | Mori et al. | |
| 2009/0087731 A1 | 4/2009 | Fukui et al. | |
| 2009/0155694 A1 | 6/2009 | Park | |
| 2010/0092846 A1 | 4/2010 | Inagaki et al. | |
| 2010/0285356 A1 | 11/2010 | Choi et al. | |
| 2010/0297213 A1 | 11/2010 | Dupont et al. | |
| 2011/0123866 A1 | 5/2011 | Pan et al. | |
| 2011/0168550 A1 | 7/2011 | Wang et al. | |
| 2011/0293990 A1 | 12/2011 | Ryu et al. | |
| 2012/0141877 A1 | 6/2012 | Choi et al. | |
| 2012/0164530 A1 | 6/2012 | Temmyo et al. | |
| 2012/0183842 A1 | 7/2012 | Kawasaki et al. | |
| 2012/0219841 A1 | 8/2012 | Bolandi et al. | |
| 2012/0301789 A1 | 11/2012 | Loveness et al. | |
| 2012/0328942 A1 | 12/2012 | Thomas-Alyea et al. | |
| 2013/0271085 A1 | 10/2013 | Chen et al. | |
| 2014/0059820 A1 | 3/2014 | Wright et al. | |
| 2014/0154401 A1 | 6/2014 | Salot et al. | |
| 2014/0170476 A1 | 6/2014 | Tan et al. | |
| 2014/0178769 A1 | 6/2014 | Pirk et al. | |
| 2014/0255779 A1 | 9/2014 | Min et al. | |
| 2014/0272564 A1 | 9/2014 | Holme et al. | |
| 2014/0287316 A1 | 9/2014 | Ahn et al. | |
| 2014/0377661 A1 | 12/2014 | Lee et al. | |
| 2015/0027615 A1 | 1/2015 | Singh et al. | |
| 2015/0064556 A1 | 3/2015 | Lee et al. | |
| 2015/0104714 A1 | 4/2015 | Galande et al. | |
| 2015/0194678 A1 | 7/2015 | Jeong et al. | |
| 2015/0246816 A1 | 9/2015 | Liu et al. | |
| 2016/0013480 A1 | 1/2016 | Sikha et al. | |
| 2016/0211513 A1 | 7/2016 | Hao et al. | |
| 2016/0211523 A1 | 7/2016 | Ueda et al. | |
| 2016/0285101 A1 | 9/2016 | Yoshio et al. | |
| 2016/0336617 A1 | 11/2016 | Yamazaki | |
| 2016/0351941 A1 | 12/2016 | Kobayashi | |
| 2017/0033350 A1 | 2/2017 | Mizuno et al. | |
| 2017/0040603 A1 | 2/2017 | Chu et al. | |
| 2017/0062812 A1 | 3/2017 | Kim et al. | |
| 2017/0062869 A1 | 3/2017 | Zhamu et al. | |
| 2017/0098823 A1 | 4/2017 | Yushin et al. | |
| 2017/0125788 A1 | 5/2017 | Ahn et al. | |
| 2018/0287145 A1 | 10/2018 | Lee et al. | |

FOREIGN PATENT DOCUMENTS

| | | |
|---|---|---|
| KR | 10-2017-0025992 A | 3/2017 |
| WO | 2011/029058 A2 | 3/2011 |

* cited by examiner

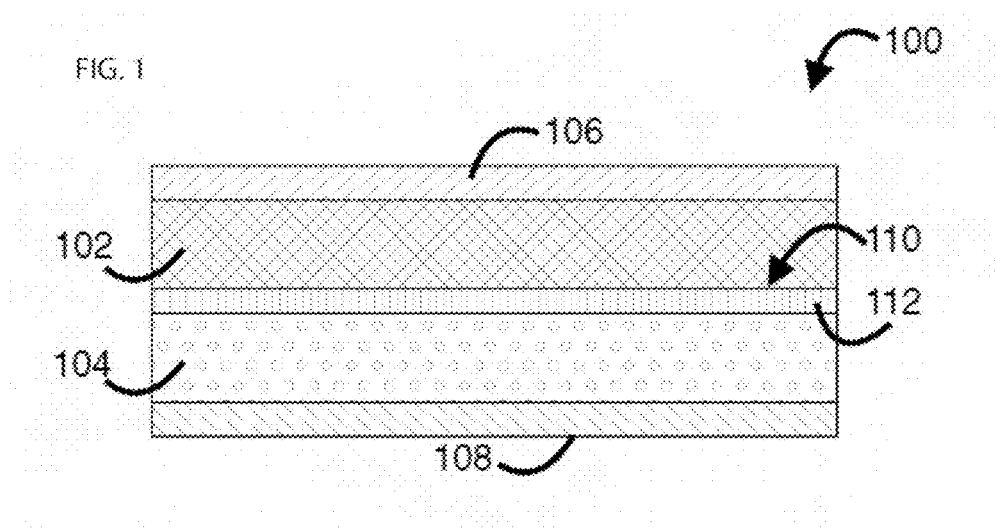
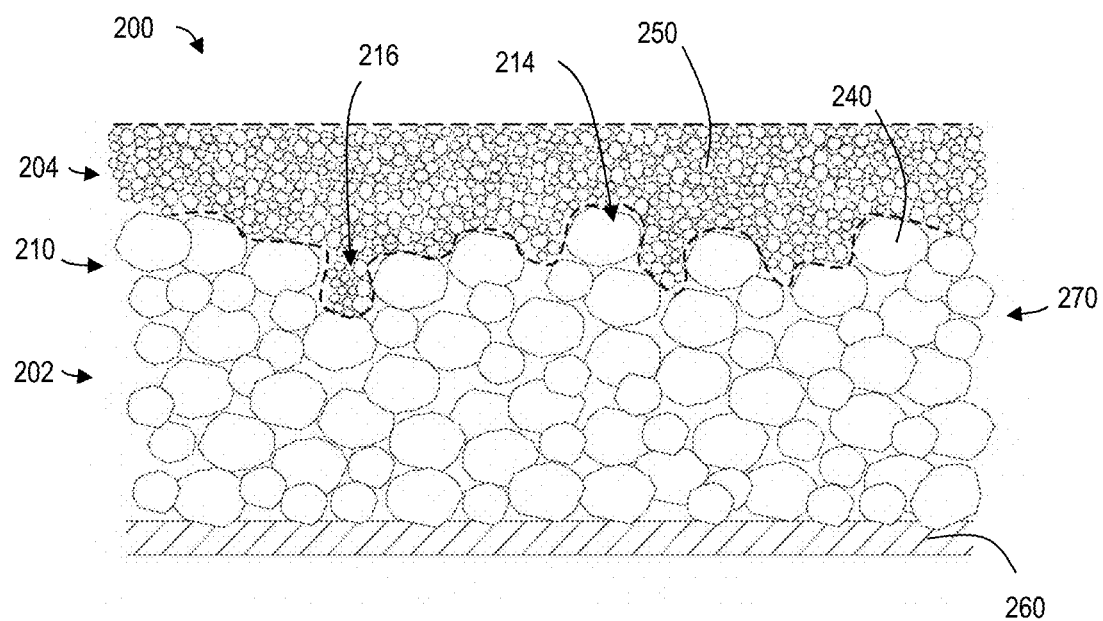
FIG. 2

ELECTROCHEMICAL CELL WITH INTEGRATED CERAMIC SEPARATOR

CROSS-REFERENCES

This application claims the benefit under 35 U.S.C. § 119(e) of the priority of U.S. Provisional Patent Application Ser. No. 62/928,975, filed Oct. 31, 2019, the entirety of which is hereby incorporated by reference for all purposes.

FIELD

This disclosure relates to systems and methods for electrochemical cells. More specifically, the disclosed embodiments relate to electrochemical cells having separators.

INTRODUCTION

Environmentally friendly sources of energy have become increasingly critical, as fossil fuel-dependency becomes less desirable. Most non-fossil fuel energy sources, such as solar power, wind, and the like, require some sort of energy storage component to maximize usefulness. Accordingly, battery technology has become an important aspect of the future of energy production and distribution. Most pertinent to the present disclosure, the demand for secondary (i.e., rechargeable) batteries has increased. Various combinations of electrode materials and electrolytes are used in these types of batteries, such as lead acid, nickel cadmium (Ni-Cad), nickel metal hydride (NiMH), lithium ion (Li-ion), and lithium ion polymer (Li-ion polymer).

SUMMARY

The present disclosure provides systems, apparatuses, and methods relating to electrochemical cells including ceramic separators.

In some embodiments, an electrochemical cell including a ceramic separator may include: a first electrode having: a first current collector substrate, a first active material layer layered onto the first current collector substrate, the first active material layer comprising a plurality of first active material particles, a first integrated separator layer layered onto the first active material layer, the first integrated separator layer comprising a plurality of first ceramic separator particles, and a first interlocking region disposed between and coupling the first active material layer to the first separator layer, wherein the first interlocking region comprises a non-planar interpenetration of first fingers of the first active material layer and second fingers of the first integrated separator layer; a second electrode; and a polyolefin separator disposed between the first ceramic separator layer and the second electrode.

In some embodiments, an electrochemical cell including ceramic separators may include: a first electrode including: a first current collector substrate, a first active material layer layered onto the first current collector substrate, the first active material layer comprising a plurality of first active material particles, a first integrated separator layer layered onto the first active material layer, the first integrated separator layer comprising a plurality of first ceramic separator particles, a first interlocking region disposed between and coupling the first active material layer to the first separator layer, wherein the first interlocking region comprises a non-planar interpenetration of first fingers of the first active material layer and second fingers of the first integrated separator layer, and a second electrode including: a second current collector substrate, a second active material layer layered onto the second current collector substrate, the second active material layer comprising a plurality of second active material particles, a second integrated separator layer layered onto the second active material layer, the second integrated separator layer comprising a plurality of second ceramic separator particles, and a second interlocking region disposed between and coupling the second active material layer to the second separator layer, wherein the second interlocking region comprises a non-planar interpenetration of third fingers of the second active material layer and fourth fingers of the second integrated separator layer; and a polyolefin separator disposed between the first ceramic separator layer and the second ceramic separator layer.

In some embodiments, an electrochemical cell including ceramic separators may include: a first electrode including: a first current collector substrate, a first active material layer layered onto the first current collector substrate, the first active material layer comprising a plurality of first active material particles, a first integrated separator layer layered onto the first active material layer, the first integrated separator layer comprising a plurality of first ceramic separator particles, and a first interlocking region disposed between and coupling the first active material layer to the first separator layer, wherein the first interlocking region comprises a non-planar interpenetration of first fingers of the first active material layer and second fingers of the first integrated separator layer; and a second electrode including: a second current collector substrate, a second active material layer layered onto the second current collector substrate, the second active material layer comprising a plurality of second active material particles, a second integrated separator layer layered onto the second active material layer, the second integrated separator layer comprising a plurality of second ceramic separator particles, and a second interlocking region disposed between and coupling the second active material layer to the second separator layer, wherein the second interlocking region comprises a non-planar interpenetration of third fingers of the second active material layer and fourth fingers of the second integrated separator layer; wherein the first integrated separator layer is adjacent to and in direct contact with the second integrated separator layer.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 1 is a schematic sectional view of an illustrative electrochemical cell.

FIG. 2 is a sectional view of an illustrative electrode including an integrated ceramic separator.

DETAILED DESCRIPTION

Figure 3:
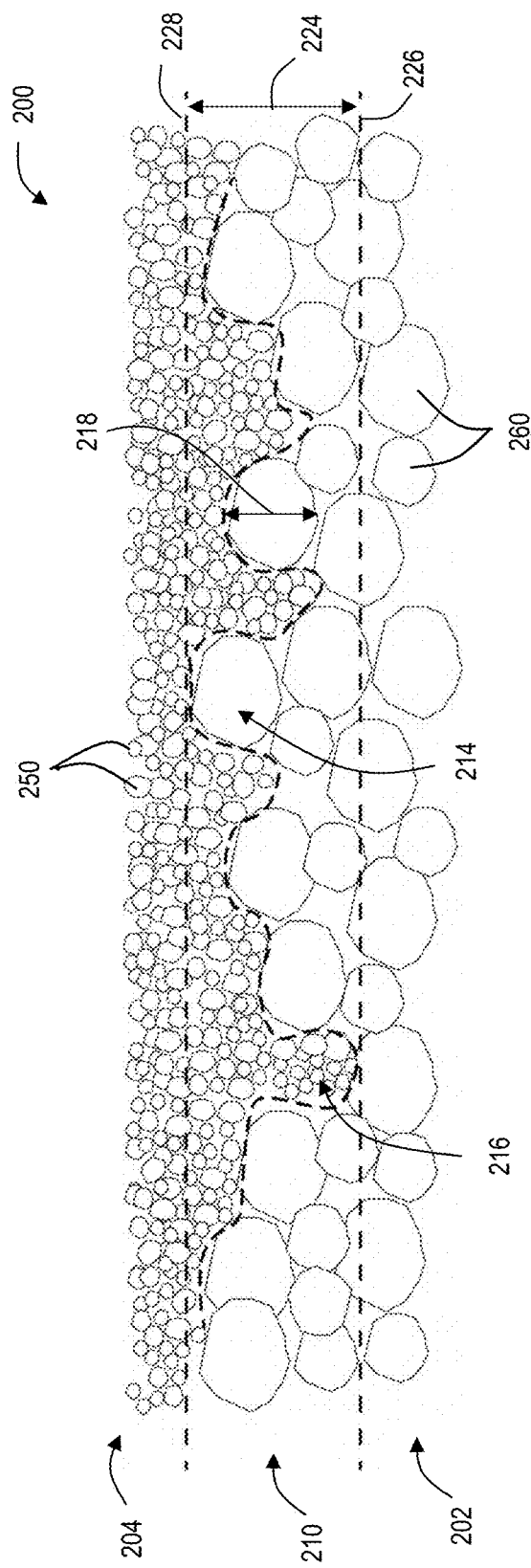
FIG. 3 is a sectional view of an interlocking region included within the illustrative electrode of FIG. 2.

Various aspects and examples of an electrochemical cells including ceramic separators, as well as related methods, are described below and illustrated in the associated drawings. Unless otherwise specified, an electrochemical cell in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A through I, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

"Coupled" means connected, either permanently or releasably, whether directly or indirectly through intervening components.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, an electrochemical cell including an integrated ceramic separator in accordance with the present teachings may include a first electrode (e.g., an anode) and a second electrode (e.g., a cathode), one or both of which may include an integrated ceramic separator layer configured to electrically isolate the first and second electrodes from each other. Each electrode may include a plurality of active material particles adhered together by a binder. In some examples, electrodes may include one or more active material layers, each including a plurality of active material particles adhered together by a binder.

An electrode including an integrated ceramic separator layer may include an electrode layer having a plurality of active material particles adhered together by a first binder, and a separator layer including a plurality of ceramic particles adhered together by a second binder. The electrode further includes an interlocking region (AKA an interphase region) disposed between and adhering the electrode layer and the separator layer, wherein the interlocking region comprises a non-planar boundary between the electrode layer and the separator layer.

The electrode layer may include a first active material layer including a plurality of first active material particles. In some embodiments, the electrode layer further includes a second active material layer including a plurality of second active material particles, defining a multilayer architecture. The first and second active material layers may have different porosities, different material chemistries, different active material particle sizes, and/or any alternative material property affecting electrode function. The electrode layer may have a thickness, measured as a distance perpendicular to the plane of a current collector to which the electrode is adhered and an opposing (AKA upper) surface of the electrode layer.

The separator layer may include a first plurality of inorganic particles. In some embodiments, the inorganic particles may be ceramics such as aluminum oxide (i.e., alumina ($\alpha$-Al2O3)), corundum, calcined, tabular, synthetic boehmite, silicon oxides or silica, zirconia, and/or the like. In some examples, the ceramic separator particles may have a D50 and/or an average D50 (AKA mass-median diameter) between 100 nm and 10 µm. The separator may have any suitable range of thicknesses (e.g., 1 µm-50 µm). The separator layer may be configured such that the separator isolates the electrode (e.g., anode or cathode) from an adjacent electrode included within the electrochemical cell, while maintaining permeability to a charge carrier such as a lithium-ion containing electrolyte. In some examples, both electrodes may include a separator layer such that each electrode is similarly isolated.

The interlocking region may include a non-planar interpenetration of the electrode layer and the separator layer, in which first fingers or protrusions of the first layer interlock with second fingers or protrusions of the second layer. The interlocking layer or interface region created by the interpenetration of the electrode layer and the separator layer may reduce interfacial resistance and increase ion mobility through the electrode. The integrated separator may also prevent crust formation on active material surface of electrode, which may impede flow of ions.

In some examples, the electrochemical cell may further include a mono-layer polyolefin film disposed between the first electrode and the second electrode, which may provide a thermal shutoff mechanism for the electrochemical cell. The polyolefin film may melt at high temperatures, which may shut off ion flow between electrodes, increasing cell safety. The polyolefin film may comprise any suitable polyolefin, such as polyethylene, polypropylene, and/or any suitable thermoplastic polyolefin. In some examples, the mono-layer polyolefin film may have a thickness less than 20 µm. In some examples, the mono-layer polyolefin film may have a thickness less than 10 µm.

In general, a method of manufacture for an electrochemical cell including an integrated ceramic separator includes providing an anode and providing a cathode, at least one of which includes an integrated ceramic separator. In some examples, the method further includes providing a polyolefin separator film, such that the polyolefin film is disposed between the cathode and the anode. In some examples, the method further includes calendering or compressing a cell stack including a plurality of stacked cathodes and anodes. In some examples, the method further includes packaging the electrochemical cell, such as in a can (e.g., for a wound cell), or a pouch bag (e.g., for a pouch cell).

EXAMPLES, COMPONENTS, AND ALTERNATIVES

The following sections describe selected aspects of illustrative electrochemical cells including integrated ceramic separators as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Electrochemical Cell

This section describes an electrochemical cell including a positive and negative electrode having a separator disposed between them in accordance with aspects of the present teachings. The electrochemical cell may be any bipolar electrochemical device, such as a battery (e.g., lithium-ion battery, secondary battery).

Referring now to FIG. 1, an electrochemical cell 100 is illustrated schematically in the form of a lithium-ion battery. Electrochemical cell 100 includes a positive and a negative electrode, namely a cathode 102 and an anode 104. The cathode and anode are sandwiched between a pair of current collectors 106, 108, which may comprise metal foils or other suitable substrates. Current collector 106 is electrically coupled to cathode 102 and current collector 108 is electrically coupled to anode 104. The current collectors enable the flow of electrons, and thereby electrical current, into and out of each electrode. An electrolyte 110 disposed throughout the electrodes enables the transport of ions between cathode 102 and anode 104. In the present example, electrolyte 110 includes a liquid solvent and a solute of dissolved ions. Electrolyte 110 facilitates an ionic connection between cathode 102 and anode 104.

Electrolyte 110 is assisted by a separator 112, which physically partitions the space between cathode 102 and anode 104. Separator 112 is liquid permeable and enables the movement (AKA flow) of ions within electrolyte 110 and between the two electrodes. As described further below, separator 112 may be integrated within one or both of cathode 102 and anode 104. In some embodiments, for example, separator 112 comprises a layer of ceramic particles applied to a top surface of an electrode (i.e., cathode 102 or anode 104), such that the ceramic particles of separator 112 are interpenetrated or intermixed with active material particles of cathode 102 or anode 104. In some embodiments, electrolyte 110 includes a polymer gel or solid ion conductor, augmenting or replacing (and performing the function of) separator 112.

Cathode 102 and anode 104 are composite structures, which comprise active material particles, binders, conductive additives, and pores (void space) into which electrolyte 110 may penetrate. An arrangement of the constituent parts of an electrode is referred to as a microstructure, or more specifically, an electrode microstructure.

In some examples, the binder is a polymer, e.g., polyvinylidene difluoride (PVdF), and the conductive additive typically includes a nanometer-sized carbon, e.g., carbon black or graphite. In some examples, the binder is a mixture of carboxyl-methyl cellulose (CMC) and styrene-butadiene rubber (SBR). In some examples, the conductive additive includes a ketjen black, a graphitic carbon, a low dimensional carbon (e.g., carbon nanotubes), and/or a carbon fiber.

In some examples, the chemistry of the active material particles differs between cathode 102 and anode 104. For example, anode 104 may include graphite (artificial or natural), hard carbon, titanate, titania, transition metals in general, elements in group 14 (e.g., carbon, silicon, tin, germanium, etc.), oxides, sulfides, transition metals, halides, and/or chalcogenides. On the other hand, cathode 102 may include transition metals (for example, nickel, cobalt, manganese, copper, zinc, vanadium, chromium, iron), and their oxides, phosphates, phosphites, and silicates. In some examples, the cathode may include alkalines and alkaline earth metals, aluminum, aluminum oxides and aluminum phosphates, halides, and/or chalcogenides. In an electrochemical device, active materials participate in an electrochemical reaction or process with a working ion to store or release energy. For example, in a lithium-ion battery, the working ions are lithium ions.

Electrochemical cell 100 may include packaging (not shown). For example, packaging (e.g., a prismatic can, stainless steel tube, polymer pouch, etc.) may be utilized to constrain and position cathode 102, anode 104, current collectors 106 and 108, electrolyte 110, and separator 112.

For electrochemical cell 100 to properly function as a secondary battery, active material particles in both cathode 102 and anode 104 must be capable of storing and releasing lithium ions through the respective processes known as lithiating and delithiating. Some active materials (e.g., layered oxide materials or graphitic carbon) fulfill this function by intercalating lithium ions between crystal layers. Other active materials may have alternative lithiating and delithiating mechanisms (e.g., alloying, conversion).

When electrochemical cell 100 is being charged, anode 104 accepts lithium ions while cathode 102 donates lithium ions. When a cell is being discharged, anode 104 donates lithium ions while cathode 102 accepts lithium ions. Each composite electrode (i.e., cathode 102 and anode 104) has a rate at which it donates or accepts lithium ions that depends upon properties extrinsic to the electrode (e.g., the current passed through each electrode, the conductivity of the electrolyte 110) as well as properties intrinsic to the electrode (e.g., the solid state diffusion constant of the active material particles in the electrode; the electrode microstructure or tortuosity; the charge transfer rate at which lithium ions move from being solvated in the electrolyte to being intercalated in the active material particles of the electrode; etc).

During either mode of operation (charging or discharging) anode 104 or cathode 102 may donate or accept lithium ions at a limiting rate, where rate is defined as lithium ions per unit time, per unit current. For example, during charging, anode 104 may accept lithium at a first rate, and cathode 102 may donate lithium at a second rate. When the second rate is lesser than the first rate, the second rate of the cathode would be a limiting rate. In some examples, the differences in rates may be so dramatic as to limit the overall performance of the lithium-ion battery (e.g., cell 100). Reasons for the differences in rates may depend on an energy required to lithiate or delithiate a quantity of lithium-ions per mass of active material particles; a solid state diffusion coefficient of lithium ions in an active material particle; and/or a particle size distribution of active material within a composite electrode. In some examples, additional or alternative factors may contribute to the electrode microstructure and affect these rates.

B. Illustrative Electrode with Integrated Ceramic Separator

Operation of an energy storage device under demanding conditions at the limits of an electrode's capabilities may require the accommodation of stresses induced by volume expansion (swelling) and contraction during the charging and discharging of battery electrodes. This may introduce structural and functional challenges, as an electrochemical cell including the electrode may have one or more layers, each swelling or contracting at different rates during battery charging and discharging. More specifically, active material layers of electrodes may expand and contract during battery use, while inert separator particles may remain constant in size. In some examples, additional components of electrochemical cells may shrink or expand at different rates during battery use. For example, polyolefin separators, commonly used in lithium-ion batteries, may shrink while an adjacent electrode expands, increasing the risk that a battery including the electrode will short during use.

Ensuring continued structural integrity of an electrode-separator interface is therefore necessary to prevent shorting between cathodes and anodes included in the battery, introducing several design considerations. A mechanical integrity or coherence of the electrochemical cell must be maintained so that an electrode and an adjacent separator remain mechanically stable and adhered to each other. Additionally, an interface between the active material layers and the separator should not block or inhibit a flow of ions through the electrochemical cell. In the case of an anode, the interface between the layers should not create regions of increased densification. Such increased densification can result in solid electrolyte interphase (SEI) buildup at the interface between the layers that subsequently blocks pores and induces lithium plating. These issues present challenges to be addressed in the production of an electrochemical cell with a separator.

Accordingly, an electrochemical cell according to the present disclosure may include one or more electrodes having an integrated ceramic separator. With reference to FIG. 2, a single layer electrode 200 having an integrated ceramic separator is shown. Electrode 200 is an example of an anode or cathode suitable for inclusion in an electrochemical cell, similar to cathode 102 or anode 104, described above. Electrode 200 includes a current collector substrate 260 and an electrode material composite 270 layered onto the current collector substrate. Electrode material composite 270 includes an active material layer 202 and an integrated separator layer 204, with an interlocking region 210 disposed between active material layer 202 and integrated separator layer 204. Interlocking region 210 comprises a non-planar boundary between active material layer 202 and integrated separator layer 204, configured to decrease interfacial resistance between the layers and reduce lithium plating on the electrode layer.

Active material layer 202 is disposed on and directly in contact with current collector substrate 260. Active material layer 202 includes a plurality of first active material particles 240 adhered together by a first binder. Active material layer 202 may further include a conductive additive mixed with the active material particles. In some examples, the binder is a polymer, e.g., polyvinylidene difluoride (PVdF), and the conductive additive typically includes a nanometer-sized carbon, e.g., carbon black or graphite. In some examples, the binder is a mixture of carboxyl-methyl cellulose (CMC) and styrene-butadiene rubber (SBR). In some examples, the conductive additive includes a ketjen black, a graphitic carbon, a low dimensional carbon (e.g., carbon nanotubes), and/or a carbon fiber.

In some examples, electrode 200 is an anode suitable for inclusion within an electrochemical cell. In the case of such an anode, active material particles 240 may comprise graphite (artificial or natural), hard carbon, titanate, titania, transition metals in general, elements in group 14 (e.g., carbon, silicon, tin, germanium, etc.), oxides, sulfides, transition metals, halides, and/or chalcogenides.

In some examples, electrode 200 is a cathode suitable for inclusion within an electrochemical cell. In the case of such a cathode, active material particles 240 may comprise transition metals (for example, nickel, cobalt, manganese, copper, zinc, vanadium, chromium, iron), and their oxides, phosphates, phosphites, and silicates. In some examples, the cathode active material particles may include alkalines and alkaline earth metals, aluminum, aluminum oxides and aluminum phosphates, halides and/or chalcogenides.

As depicted in FIG. 2, integrated separator layer 204 may be layered onto active material layer 202, and may include a plurality of ceramic particles 250 adhered together by a second binder. Although ceramic particles 250 are referred to as ceramics, particles 250 may comprise any suitable inorganic material or materials, including ceramics such as aluminum oxide (i.e., alumina ($\alpha$-$Al_2O_3$)), corundum, calcined, tabular, synthetic boehmite, silicon oxides or silica, zirconia, and/or the like. Ceramic particles 250 may be electrically non-conductive. Ceramic particles 250 may have a greater hardness than active material particles 240. As a result, separator layer 204 may have a higher resistance to densification and lower compressibility than active material layer 202. In some examples, the second binder is a polymer, e.g., polyvinylidene difluoride (PVdF). Integrated separator layer 204 may have any thickness suitable for allowing ionic conduction while electrically insulating the electrode. In some examples, separator layer 204 may have a thickness between one μm and fifty μm.

Integrated separator layer 204 may comprise varying mass fractions of inorganic particles (e.g., ceramic particles) and varying mass fractions of binders and other additives. In some examples, the separator layer is between 50% and 99% inorganic material. In other examples, the separator layer is greater than 99% inorganic material and less than 1% binder. In the examples having greater than 99% inorganic material, the electrode may be manufactured in a similar fashion to electrodes with separator layers having lower percentages of inorganic material, optionally followed by ablation of excess binder during post-processing.

In other examples, the separator layer is less than 50% inorganic material and greater than 50% binder, by mass. In these cases, the binder may comprise a coblocked polymer such as a polyamide, polyethylene, polypropylene, polyolefin, and/or any suitable polymer with a porous structure. The binder may comprise a first polypropylene layer, a second polypropylene layer, and a polyethylene layer intermediate the polypropylene layers. This high-binder content configuration may function as a "shutdown" mechanism for the electrode. For example, the polyethylene layer may melt or collapse at high temperatures (e.g., in a fire), thus stopping ionic and electrode conduction and thereby improving device safety. On the other hand, the high-binder embodiments may decrease calendering advantages seen in separator layers with higher fractions of inorganic material.

Interlocking region 210 includes a non-planar boundary between active material layer 202 and separator layer 204. Active material layer 202 and separator layer 204 have respective, three-dimensional, interpenetrating fingers 214 and 216 that interlock the two layers together, forming a mechanically robust interface that is capable of withstanding stresses, such as those due to electrode expansion and contraction, and separator shrinking. Additionally, the non-planar surfaces defined by fingers 214 and fingers 216 represent an increased total surface area of the interface boundary, which may provide reduced interfacial resistance and may increase ion mobility through the electrode. Fingers 214 and 216 may be interchangeably referred to as fingers, protrusions, extensions, projections, and/or the like. Furthermore, the relationship between fingers 214 and 216 may be described as interlocking, interpenetrating, intermeshing, interdigitating, interconnecting, interlinking, and/or the like.

Fingers 214 and fingers 216 are a plurality of substantially discrete interpenetrations, wherein fingers 214 are generally made up of electrode active material particles 240 and fingers 216 are generally made up of ceramic separator particles 250. The fingers are three-dimensionally interdigitated, analogous to an irregular form of the stud-and-tube construction of Lego bricks. Accordingly, fingers 214 and 216 typically do not span the electrode in any direction, such that a cross section perpendicular to that of FIG. 2 will also show a non-planar, undulating boundary similar to the one shown in FIG. 2. Interlocking region 210 may alternatively be referred to as a non-planar interpenetration of active material layer 202 and separator layer 204, including fingers 214 interlocked with fingers 216.

As shown in FIG. 3, although fingers 214 and 216 may not be uniform in size or shape, the fingers may have an average or typical length 218. In some examples, length 218 of fingers 214 and 216 may fall in a range between two and five times the average particle size of the first active material layer or the separator layer, whichever is smaller. In some examples, length 218 of fingers 214, 216 may fall in a range between six and ten times the average particle size of the first active material layer or the separator layer, whichever is smaller. In some examples, length 218 of fingers 214 and 216 may fall in a range between eleven and fifty times the average particle size of the first active material layer or the separator layer, whichever is smaller. In some examples, length 218 of fingers 214 and 216 may be greater than fifty times the average particle size of the first active material layer or the separator layer, whichever is smaller.

In some examples, length 218 of fingers 214 and 216 may fall in a range of approximately five hundred to approximately one thousand nanometers. In some examples, length 218 of fingers 214 and 216 may fall in a range of approximately one to approximately five μm. In some examples, length 218 of fingers 214 and 216 may fall in a range between approximately six and approximately ten μm. In another example, length 218 of fingers 214 and 216 may fall in a range between approximately eleven and approximately fifty μm. In another example, length 218 of fingers 214 and 216 may be greater than approximately fifty μm.

In the present example, a total thickness 224 of interlocking region 210 is defined by the level of interpenetration between the two electrode material layers (first active material layer 202 and separator layer 204). A lower limit 226 may be defined by the lowest point reached by separator layer 204 (i.e., by fingers 216). An upper limit 228 may be defined by the highest point reached by first active material layer 202 (i.e., by fingers 214). Total thickness 224 of interlocking region 210 may be defined as the separation or distance between limits 226 and 228. In some examples, the total thickness of interlocking region 210 may fall within one or more of various relative ranges, such as between approximately 200% (2×) and approximately 500% (5×), approximately 500% (5×) and approximately 1000% (10×), approximately 1000% (10×) and approximately 5000% (50×), and/or greater than approximately 5000% (50×) of the average particle size of the first active material layer or the separator layer, whichever is smaller.

In some examples, total thickness 224 of interlocking region 210 may fall within one or more of various absolute ranges, such as between approximately 500 and one thousand nanometers, one and approximately ten µm, approximately ten and approximately fifty µm, and/or greater than approximately fifty µm.

In the present example, first active material particles 240 in first active material layer 202 have a distribution of volumes which have a greater average than an average volume of ceramic particles 250 in separator layer 204 i.e., a larger average size. In some examples, first active material particles 240 have a collective surface area that is less than the collective surface area of ceramic particles 250.

In the present example, first active material particles 240 and ceramic particles 250 are substantially spherical in particle morphology. In other examples, one or both of the plurality of particles in either the first active material layer or the separator layer may have particle morphologies that are: flake-like, platelet-like, irregular, potato-shaped, oblong, fractured, agglomerates of smaller particle types, and/or a combination of the above.

When particles of electrode portion 200 are lithiating or delithiating, electrode portion 200 remains coherent, and the first active material layer and the separator layer remain bound by interlocking region 210. In general, the interdigitation or interpenetration of fingers 214 and 216, as well as the increased surface area of the interphase boundary, function to adhere or couple the two zones together.

In one example, electrode portion 200 is a portion of a cathode included in a lithium ion cell. In this example, during charging of the lithium ion cell, first active material particles 240 delithiate. During this process, the active material particles may contract, causing active material layer 202 to contract. In contrast, during discharging of the cell, the active material particles lithiate and swell, causing active material layer 202 to swell.

In an alternate example, electrode portion 200 is a portion of an anode included in a lithium ion cell. In this example, during charging of the lithium ion cell, first active material particles 240 lithiate. During this process, the active material particles may swell, causing active material layer 202 to swell. In contrast, during discharging of the cell, first active material particles 240 delithiate and contract, causing contraction of active material layer 202.

In either of these examples, during swelling and contracting, electrode portion 200 may remain coherent, and active material layer 202 and separator layer 204 remain bound by interlocking region 210. This bonding of the active material layer and separator layer may decrease interfacial resistance between the layers and maintain mechanical integrity of an electrochemical cell including the electrode.

Interlocking region 210 may comprise a network of fluid passageways defined by active material particles, ceramic particles, binder, conductive additives, and/or additional layer components. These fluid passages are not hampered by calendering-induced changes in mechanical or morphological state of the particles due to the non-planar boundary included in the interlocking region. In contrast, a substantially planar boundary is often associated with the formation of a crust layer upon subsequent calendering. Such a crust layer is disadvantageous as it can significantly impede ion conduction through the interlocking region. Furthermore, such a crust layer also represents a localized compaction of active material particles that effectively result in reduced pore volumes within the electrode. This may be an issue of particular importance for anodes, as solid electrolyte interphase (SEI) film buildup on active material particles clogs pores included within the electrode at a quicker rate, leading to lithium plating, decreasing safety and cycle life of the electrode.

An anode with integrated ceramic separator according to the present disclosure may experience additional benefits over alternate electrode forms. As anodes may include active material particles with comparatively larger average particle size than other electrodes (e.g., cathodes), anodes may experience increased compressibility from simultaneous calendering with an integrated separator layer. As ceramic separator particles may have a hardness greater than a hardness of the anode active material particles and therefore a greater resistance to densification during a calendering process, the ceramic separator layer may transfer compressive loads to the anode layer disposed beneath the ceramic separator layer.

Figure 4:
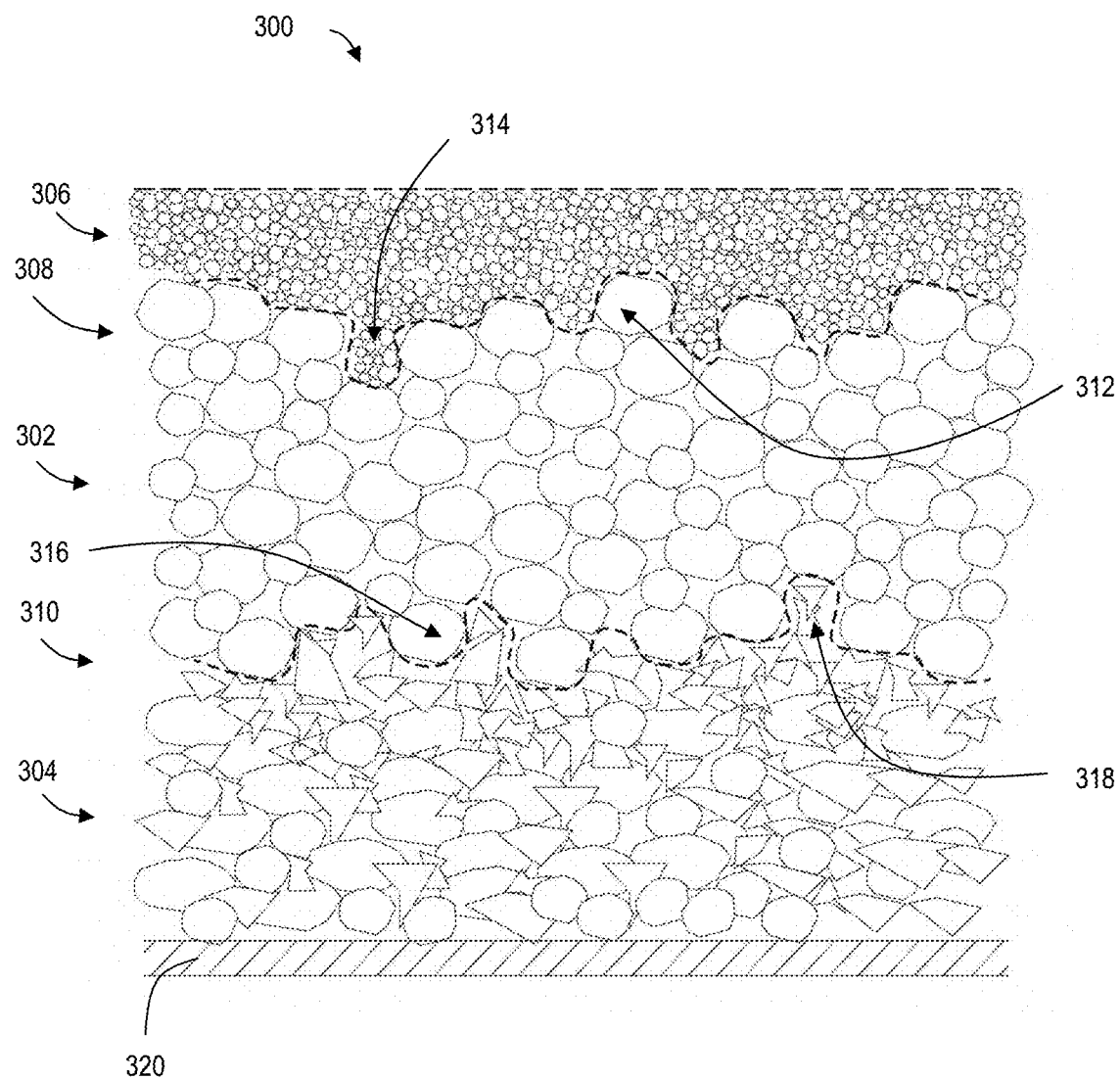
FIG. 4 is a sectional view of an illustrative multilayered electrode including an integrated ceramic separator.

In some examples, an electrode including an integrated ceramic separator may include two or more active material layers. FIG. 4 is an illustrative multi-layered electrode 300 including a first active material layer 302, a second active material layer 304, and a separator layer 306. Second active material layer 304 may be disposed adjacent to a current collector substrate 320. First active material layer 302 may be layered on top of second active material layer 304. Separator layer 306 may be layered on top of first active material layer 302. First active material layer 302 may include a plurality of first active material particles adhered together by a first binder. Second active material layer 304 may include a plurality of second active material particles adhered together by a second binder. The first and second active material particles may be substantially similar to active material particles 240, described above. Separator layer 306 may include a plurality of inorganic particles adhered together by a third binder. The inorganic particles may be substantially similar to ceramic particles 250, described above.

A first interlocking region 308 is formed between separator layer 306 and first active material layer 302. A second interlocking region 310 is formed between first active material layer 302 and second active layer 304.

First interlocking region 308 may include a non-planar boundary between first active material layer 302 and separator layer 306. First active material layer 302 may have a first plurality of fingers 312 extending toward separator layer 306. Separator layer 306 may have a second plurality of fingers 314. First interlocking region 308 may include an interpenetration of fingers 312 and fingers 314, which may bind the first active material layer and the separator layer together.

Second interlocking region 310 may include a non-planar boundary between first active material layer 302 and second active material layer 304. First active material layer 302 may have a third plurality of fingers 316 extending toward current collector substrate 320. Second active material layer 304 may have a fourth plurality of fingers 318. Second interlocking region 310 may include an interpenetration of fingers 316 and 318, which may bind the first and second active material layers together. The configuration of the fingers in first interlocking region 308 and second interlocking region 310 is substantially similar to the configuration of the fingers in interlocking region 210 of FIG. 2, described above.

C. Illustrative Electrochemical Cells Having Integrated Ceramic Separator and Polyolefin Film Separator An illustrative electrochemical cell including one or more electrodes having integrated ceramic separators, as described above, may include a polyolefin film disposed between electrodes. Known electrochemical cells include polyolefin-based separator films to provide electrical isolation between cathode and anode components of the electrochemical cell. These separators typically fall into one of three categories: mono-layer polyolefin films, ceramic-coated polyolefin films, and tri-layer polyolefin films. Mono-layer polyolefin films may include materials such as mono-layer blown polyethylene, mono-layer polypropylene, and/or the like. Ceramic-coated polyolefin films may include mono-layer or tri-layer polyolefin films coated in ceramic material to prevent lithium dendrite penetration. Tri-layer polyolefin films may include, for example, a polyethylene layer disposed between two polypropylene layers. Due to varying melting temperatures of polyethylene (~120° C.) and polypropylene (~170° C.), tri-layer separators are designed so that in the event of an internal or external short circuit, or excessive temperatures, the center polyethylene film can melt and "collapse" its pores to effectively shut off ion flow while the two polypropylene films act as a "backbone." This mechanism may prevent the separator from shrinking. A shrinking separator is dangerous, as it could expose electrode surfaces, causing bare electrodes to contact each other, exacerbating any short circuit conditions.

Although the shutoff mechanism provided by tri-layer separators is a desirable feature, these separators provide several drawbacks. First, polypropylene films may have inadequate rigidity to prevent excessive separator shrinking. This is especially a concern in cells having layered oxide cathode materials, wherein temperatures may rise quickly past 120° C. to 170° C. Second, polypropylene films may not effectively prevent lithium dendrite penetration through the polyolefin film layer. Third, tri-layer films typically have a minimum thickness of ~12 µm, which decreases energy density of the battery. In the event that a ceramic coating is included to prevent lithium dendrite penetration, the ceramic coating may add an additional 2-4 µm of thickness to the separator. Additionally, traditional polyolefin separators require a flat, calendered interface between a separator film and electrodes on opposing sides. Electrodes included in cells having traditional polyolefin separators must therefore have calendered and flattened surfaces, creating crust-like surface layers with high impedance.

However, an electrochemical cell including a positive electrode and a negative electrode, at least one of which includes an integrated ceramic separator, in addition to a polyolefin separator, may maintain the thermal shutoff mechanism of tri-layer polyolefin separators while improving cell robustness and improving operating temperature range. The integrated ceramic separator prevents shorting, and hazards caused by polyolefin separator shrinking are eliminated. The integrated ceramic separator is also lithium-dendrite impenetrable, further preventing short circuiting. Additionally, the ceramic separator and polyolefin separator in combination form a separator having a relatively low impedance, as compared with polyolefin-only examples, e.g., due to a lack of crust formation on electrode surfaces.

Figure 5:
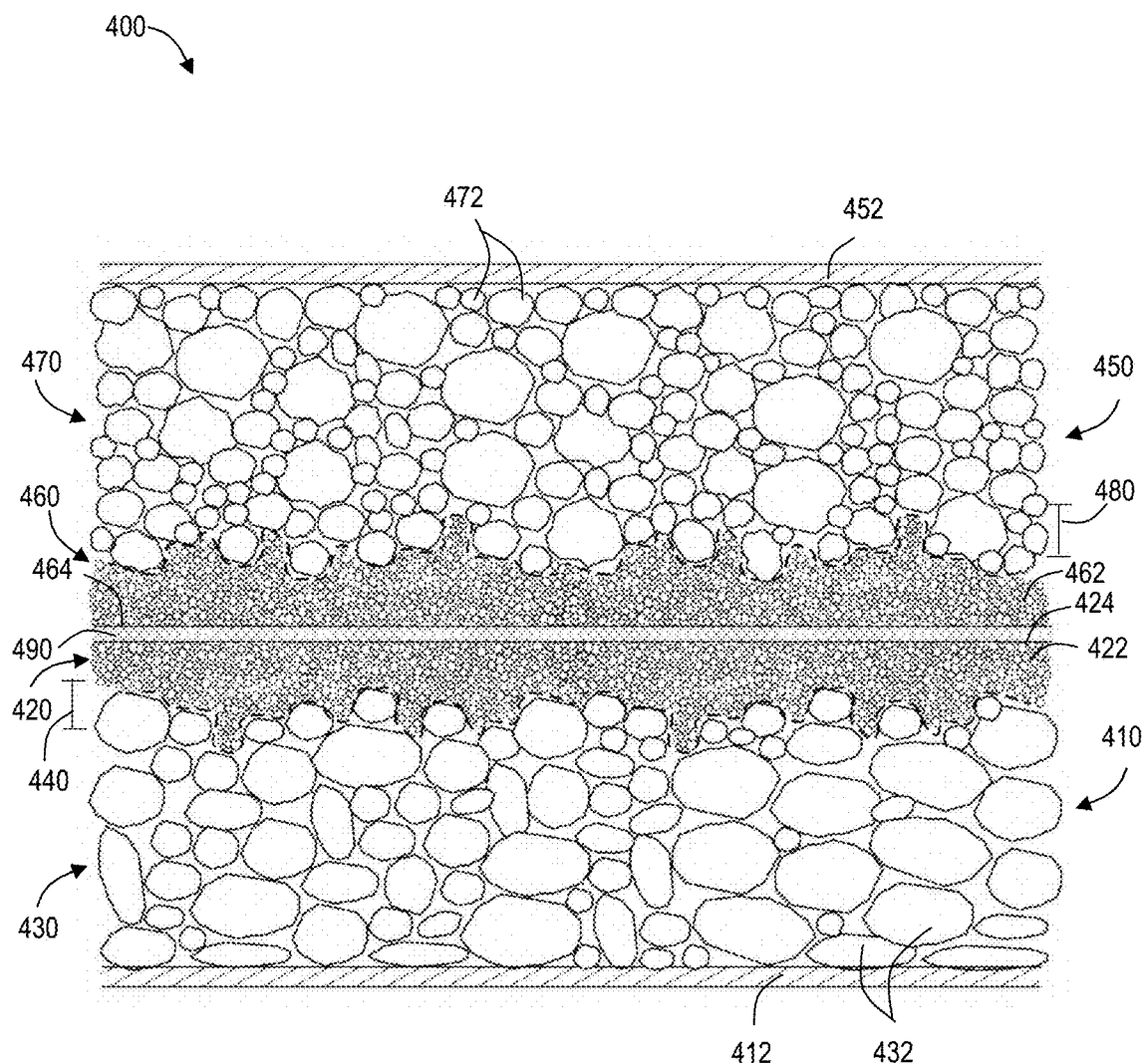
FIG. 5 is a sectional view of an illustrative electrochemical cell including an anode having an integrated ceramic separator, a cathode having an integrated ceramic separator, and a polyolefin separator disposed between the anode and the cathode.
Figure 6:
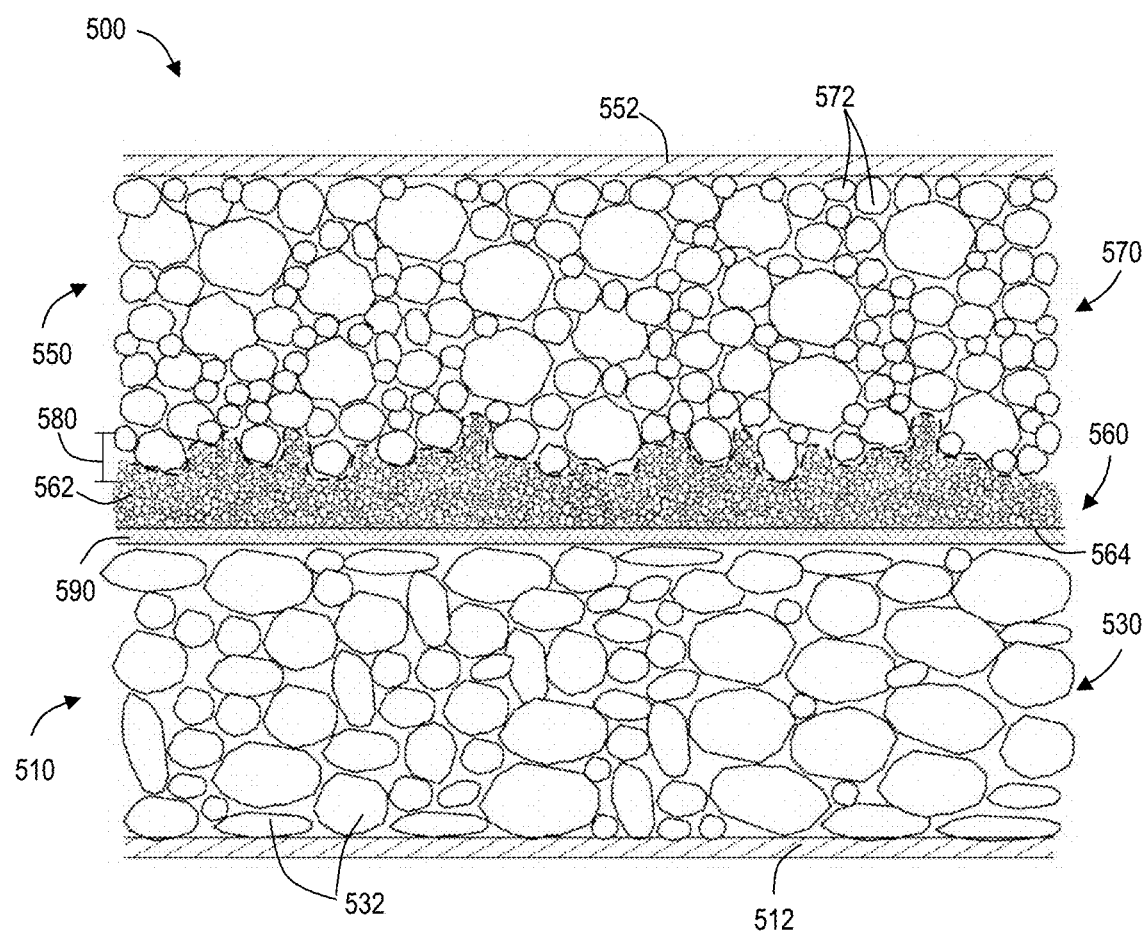
FIG. 6 is a sectional view of an illustrative electrochemical cell having an anode, a cathode having an integrated ceramic separator, and a polyolefin separator disposed between the anode and the cathode.
Figure 7:
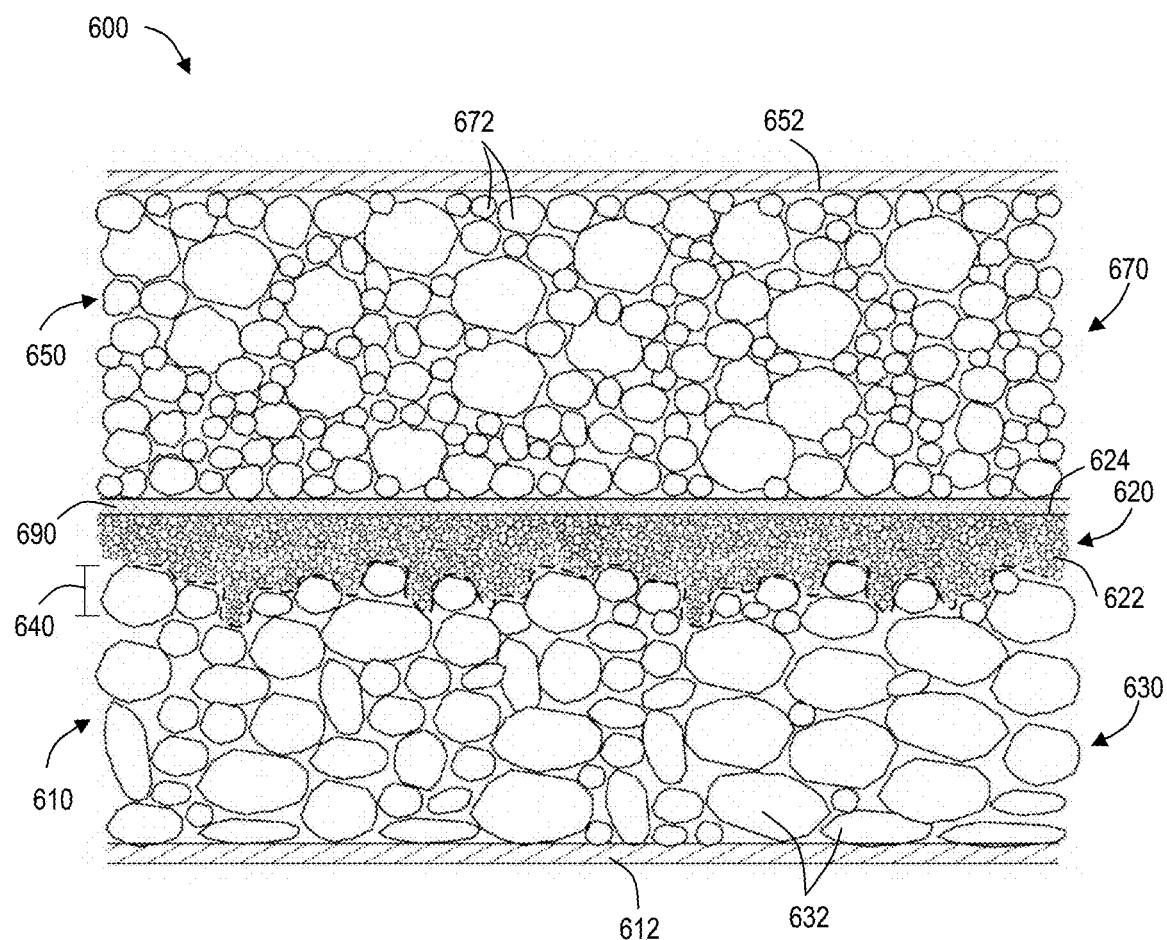
FIG. 7 is a sectional view of an illustrative electrochemical cell having an anode including an integrated ceramic separator, a cathode, and a polyolefin separator disposed between the anode and the cathode.

As shown in FIGS. 5-7, this section describes illustrative electrochemical cells including integrated ceramic separators and polyolefin film separators, which are examples of the electrochemical cells described above.

FIG. 5 shows an electrochemical cell 400 including an anode 410 having a first integrated ceramic separator 420 and a cathode 450 having a second integrated ceramic separator 460. A polyolefin separator 490 is disposed between anode 410 and cathode 450. Anode 410 and/or cathode 450 may be substantially identical to either single-layered electrode 200 or multilayered electrode 300, described above.

Anode 410 is disposed upon and in contact with a first current collector 412. First current collector 412 may include metal foils such as copper or any suitable substrate, and may be electrically coupled to anode 410.

Anode 410 may include an active material layer 430 and a separator layer 420, with active material layer 430 including a plurality of active material particles 432 adhered together by a first binder, and separator layer 420 including a plurality of inorganic and/or ceramic particles 422 adhered together by a second binder. In some examples, anode 410 may further include a second active material layer disposed between active material layer 430 and separator layer 420. In some examples, the first and second active material layers may include an interlocking region disposed between them. The interlocking region may be substantially identical to interlocking region 310 described above. Anode active material particles 432 may comprise graphite (artificial or natural), hard carbon, titanate, titania, transition metals in general, elements in group 14 (e.g., carbon, silicon, tin, germanium, etc.), oxides, sulfides, transition metals, halides, and/or chalcogenides.

Ceramic particles 422 may comprise any suitable inorganic material or materials, including ceramics such as aluminum oxide (i.e., alumina ($\alpha$-$Al_2O_3$)), corundum, calcined, tabular, synthetic boehmite, silicon oxides or silica, zirconia, and/or the like. Ceramic particles 422 may be electrically non-conductive In some examples, ceramic particles 422 may have a D50 (AKA mass-median diameter) between 100 nm and 10 µm.

An interlocking region 440 may be disposed between active material layer 430 and separator layer 420. Interlocking region 440 may be substantially identical to interlocking region 210 of illustrative electrode 200, described above. Anode 410 may be optionally calendered to provide a relatively flat surface at a top surface 424 of separator layer 420.

Polyolefin separator 490 is layered on top of separator layer 420 of anode 410. Polyolefin separator 490 may comprise any suitable polyolefin material, such as polyethylene, polypropylene, and/or any suitable thermoplastic polyolefin. In some examples, polyolefin separator 490 may have a thickness of less than 20 µm. In some examples, polyolefin separator 490 may have a thickness of less than 10 µm.

Cathode 450 is disposed upon and in contact with polyolefin separator 490. Cathode 450 may include an active material layer 470 and a separator layer 460, with active material layer 470 including a plurality of active material particles 472 adhered together by a first binder, and separator layer 460 including a plurality of inorganic and/or ceramic particles 462 adhered together by a second binder. In some examples, cathode 450 may further include a second active material layer disposed between active material layer 470 and separator layer 460. In some examples, the first and second active material layers may include an interlocking region disposed between them. The interlocking region may be substantially identical to interlocking region 310 described above. Cathode active particles 472 may comprise transition metals (for example, nickel, cobalt, manganese, copper, zinc, vanadium, chromium, iron), and their oxides, phosphates, phosphites, and/or silicates. In some examples, the cathode active material particles may include alkalines and alkaline earth metals, aluminum, aluminum oxides and aluminum phosphates, halides and/or chalcogenides.

Ceramic particles 462 may comprise any suitable inorganic material or materials, including ceramics such as aluminum oxide (i.e., alumina ($\alpha$-$Al_2O_3$)), corundum, calcined, tabular, synthetic boehmite, silicon oxides or silica, zirconia, and/or the like. Ceramic particles 462 may be electrically non-conductive. In some examples, ceramic particles 462 may have a D50 between 100 nm and 10 μm. In some examples, ceramic particles 422 and ceramic particles 462 may have different D50s. In some examples, ceramic particles 422 may have a greater D50 than ceramic particles 462. In some examples, ceramic particles 462 may have a greater D50 than ceramic particles 422.

An interlocking region 480 may be disposed between active material layer 470 and separator layer 460. Interlocking region 480 may be substantially identical to interlocking region 210 of illustrative electrode 200, described above. Cathode 450 may be optionally calendered to provide a flat surface at a bottom surface 464 of separator layer 460. Bottom surface 464 may contact polyolefin separator 490 such that polyolefin separator 490 is contacted by anode separator layer 420 and by cathode separator layer 460.

A second current collector 452 is disposed on and in contact with cathode 450. Second current collector 452 may include metal foils such as aluminum and/or any suitable substrate and may be electrically coupled to cathode 450.

In some examples, an electrochemical cell including an integrated ceramic separator may have a separator included in either a positive electrode or a negative electrode. In a first example, the electrochemical cell includes an integrated ceramic separator included in a cathode. FIG. 6 shows an electrochemical cell 500 including an anode 510, and a cathode 550 having an integrated ceramic separator 560. A polyolefin separator 590 is disposed between anode 510 and cathode 550. Cathode 520 may be substantially identical to either single-layered electrode 200 or multilayered electrode 300, described above.

Anode 510 is disposed upon and in contact with a first current collector 512. First current collector 512 may include metal foils such as copper or any suitable substrate, and may be electrically coupled to anode 510.

Anode 510 may include an active material composite 530 including a first plurality of anode active material particles 532 adhered together by a first binder. In some examples, anode 510 may further include a second active material layer including a second plurality of active material particles. In some examples, the first and second active material layers may include an interlocking region disposed between them. The interlocking region may be substantially identical to interlocking region 310 described above. Anode active material particles 532 may comprise graphite (artificial or natural), hard carbon, titanate, titania, transition metals in general, elements in group 14 (e.g., carbon, silicon, tin, germanium, etc.), oxides, sulfides, transition metals, halides, and/or chalcogenides. In some examples, anode 510 may be calendered to produce a flat top surface upon which polyolefin separator 590 may be disposed.

Polyolefin separator 590 is layered on top of active material composite 530 of anode 510. Polyolefin separator 590 may comprise any suitable polyolefin material, such as polyethylene, polypropylene, and/or any suitable thermoplastic polyolefin. Polyolefin separator 590 may have a thickness of less than 20 μm. In some examples, polyolefin separator 590 may have a thickness of less than 10 μm.

Cathode 550 is disposed upon and in contact with polyolefin separator 590. Cathode 550 may include an active material layer 570 and a separator layer 560, with active material layer 570 including a plurality of active material particles 572 adhered together by a first binder, and separator layer 560 including a plurality of inorganic and/or ceramic particles 562 adhered together by a second binder. In some examples, cathode 550 may further include a second active material layer disposed between active material layer 570 and separator layer 560. Cathode active particles 572 may comprise transition metals (for example, nickel, cobalt, manganese, copper, zinc, vanadium, chromium, iron), and/or their oxides, phosphates, phosphites, and silicates. In some examples, the cathode active material particles may include alkalines and alkaline earth metals, aluminum, aluminum oxides and aluminum phosphates, halides and/or chalcogenides.

Ceramic particles 562 may comprise any suitable inorganic material or materials, including ceramics such as aluminum oxide (i.e., alumina ($\alpha$-$Al_2O_3$)), corundum, calcined, tabular, synthetic boehmite, silicon oxides or silica, zirconia, and/or the like. Ceramic particles 562 may be electrically non-conductive. In some examples, ceramic particles 562 may have a D50 between 100 nm and 10 μm.

An interlocking region 580 may be disposed between active material layer 570 and separator layer 560. Interlocking region 580 may be substantially identical to interlocking region 210 of illustrative electrode 200, described above. Cathode 550 may be optionally calendered to provide a flat surface at a bottom surface 564 of separator layer 560. Bottom surface 564 may contact polyolefin separator 590, such that polyolefin separator 590 is contacted on a top side by separator layer 560.

A second current collector 552 is disposed on and in contact with cathode 550. Second current collector 552 may include metal foils such as aluminum and/or any suitable substrate and may be electrically coupled to cathode 550.

In some examples, an electrochemical cell including an integrated separator may have a separator included in an anode. FIG. 7 shows an electrochemical cell 600 including an anode 610 having an integrated ceramic separator 620 and a cathode 650. A polyolefin separator 690 is disposed between anode 610 and cathode 650. Anode 610 may be substantially identical to either single-layered electrode 200 or multilayered electrode 300, described above.

Anode 610 is disposed upon and in contact with a first current collector 612. First current collector 612 may include metal foils such as copper or any suitable substrate, and may be electrically coupled to anode 610.

Anode 610 may include an active material layer 630 and a separator layer 620, with active material layer 630 including a plurality of active material particles 632 adhered together by a first binder, and separator layer 620 including a plurality of inorganic and/or ceramic particles 622 adhered together by a second binder. In some examples, anode 610 may further include a second active material layer disposed between active material layer 630 and separator layer 620. In some examples, the first and second active material layers may include an interlocking region disposed between them. The interlocking region may be substantially identical to interlocking region 310 described above. Anode active material particles 632 may comprise graphite (artificial or natural), hard carbon, titanate, titania, transition metals in general, elements in group 14 (e.g., carbon, silicon, tin, germanium, etc.), oxides, sulfides, transition metals, halides, and/or chalcogenides.

Ceramic particles 622 may comprise any suitable inorganic material or materials, including ceramics such as aluminum oxide (i.e., alumina ($\alpha$-$Al_2O_3$)), corundum, calcined, tabular, synthetic boehmite, silicon oxides or silica, zirconia, and/or the like. Ceramic particles 622 may be electrically non-conductive. In some examples, ceramic particles 622 may have a D50 between 100 nm and 10 µm.

An interlocking region 640 may be disposed between active material layer 630 and separator layer 620. Interlocking region 640 may be substantially identical to interlocking region 210 of illustrative electrode 200, described above. Anode 610 may be optionally calendered to provide a flat surface at a top surface 624 of separator layer 620.

Polyolefin separator 690 is layered on top of separator layer 620 of anode 610. Polyolefin separator 690 may comprise any suitable polyolefin material, such as polyethylene, polypropylene, and/or any suitable thermoplastic polyolefin. Polyolefin separator 690 may have a thickness of less than 20 µm. In some examples, polyolefin separator 690 may have a thickness of less than 10 µm.

Cathode 650 is disposed upon and in contact with polyolefin separator 690. Cathode 650 may include an active material composite 670 including a first plurality of cathode active material particles 672 adhered together by a first binder. In some examples, cathode 650 may further include a second active material layer including a second plurality of active material particles. In some examples, the first and second active material layers may include an interlocking region disposed between them. The interlocking region may be substantially identical to interlocking region 310 described above. Cathode active particles 672 may comprise transition metals (for example, nickel, cobalt, manganese, copper, zinc, vanadium, chromium, iron), and/or their oxides, phosphates, phosphites, and/or silicates. In some examples, the cathode active material particles may include alkalines and alkaline earth metals, aluminum, aluminum oxides and aluminum phosphates, halides, and/or chalcogenides. In some examples, cathode 650 may be calendered such that a bottom surface of cathode 650 may rest evenly on polyolefin separator 690.

A second current collector 652 is disposed on and in contact with cathode 650. Second current collector 652 may include metal foils such as aluminum and/or any suitable substrate and may be electrically coupled to cathode 650.

Electrochemical cells according to the present disclosure may further include packaging, such as the packaging typically found in stacked cells, wound cells, and/or pouch cells.

D. Illustrative Electrochemical Cell with Anode Having Integrated Ceramic Separator and Cathode Having Integrated Ceramic Separator In some examples, electrochemical cells including integrated ceramic separators may include a negative electrode (anode) having a first integrated ceramic separator and a positive electrode (cathode) having a second integrated ceramic separator disposed adjacent to each other, such that the first integrated ceramic separator and the second integrated ceramic separator are directly in contact with each other. This configuration may result in a low impedance electrochemical cell.

Figure 8:
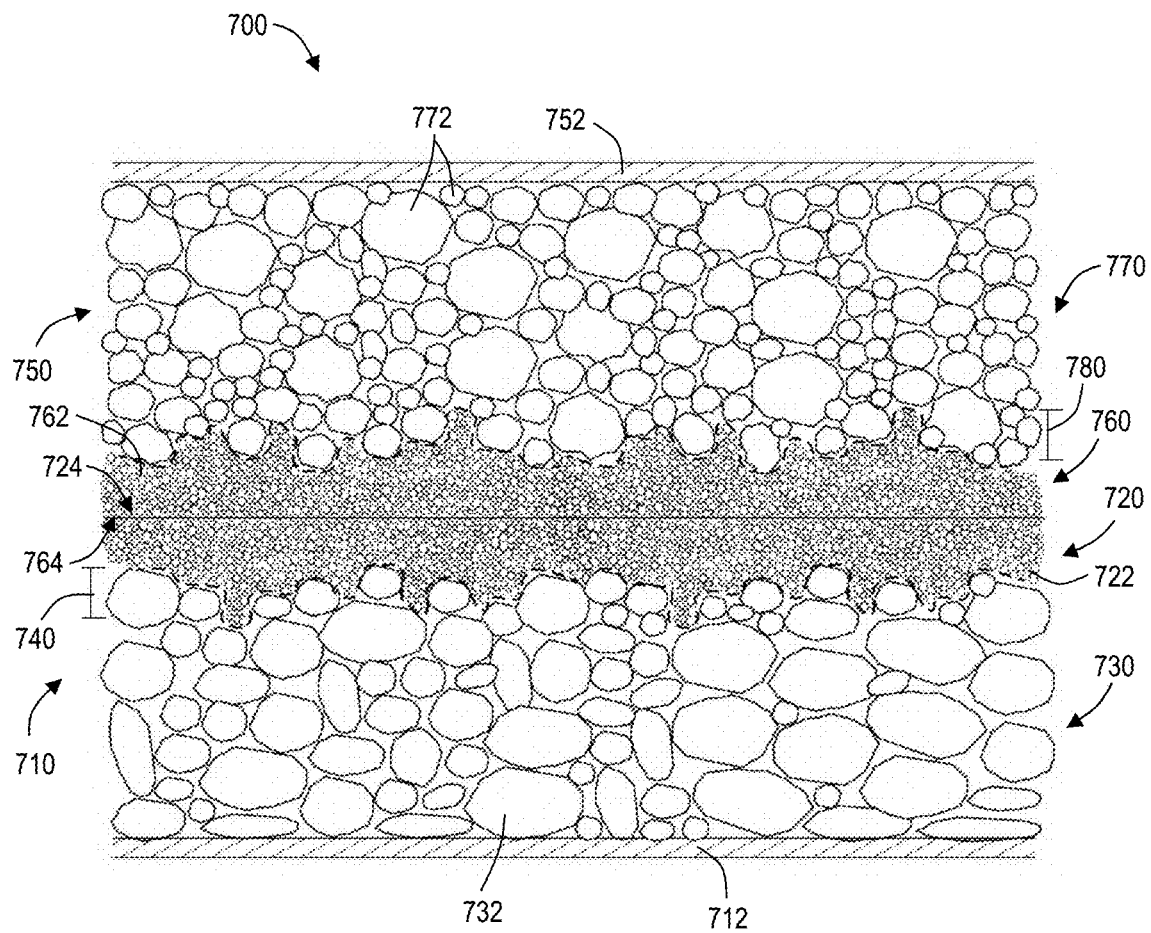
FIG. 8 is a sectional view of an illustrative electrochemical cell having an anode including an integrated ceramic separator and a cathode having an integrated ceramic separator.

FIG. 8 depicts an electrochemical cell 700 including an anode 710 having an integrated ceramic separator 720 and a cathode 750 having an integrated ceramic separator 760. Anode 710 and cathode 750 may be substantially identical to either single-layered electrode 200 or multilayered electrode 300, described above.

Anode 710 is disposed upon and in contact with a first current collector 712. First current collector 712 may include metal foils such as copper and/or any suitable substrate, and may be electrically coupled to anode 710.

Anode 710 may include an active material layer 730 and a separator layer 720, with active material layer 730 including a plurality of active material particles 732 adhered together by a first binder, and separator layer 720 including a plurality of inorganic and/or ceramic particles 722 adhered together by a second binder. In some examples, anode 710 may further include a second active material layer disposed between active material layer 730 and separator layer 720. In some examples, the first and second active material layers may include an interlocking region 740 disposed between them. The interlocking region may be substantially identical to interlocking region 310 described above. Anode active material particles 732 may comprise graphite (artificial or natural), hard carbon, titanate, titania, transition metals in general, elements in group 14 (e.g., carbon, silicon, tin, germanium, etc.), oxides, sulfides, transition metals, halides, and/or chalcogenides.

Ceramic particles 722 may comprise any suitable inorganic material or materials, including ceramics such as aluminum oxide (i.e., alumina ($\alpha$-$Al_2O_3$)), corundum, calcined, tabular, synthetic boehmite, silicon oxides or silica, zirconia, and/or the like. Ceramic particles 722 may be electrically non-conductive. In some examples, ceramic particles 722 may have a D50 between 100 nm and 10 µm.

An interlocking region 740 may be disposed between active material layer 730 and separator layer 720. Interlocking region 740 may be substantially identical to interlocking region 210 of illustrative electrode 200, described above. Anode 710 may be optionally calendered to provide a flat surface at a top surface 724 of separator layer 720.

Cathode 750 is disposed upon and in contact with anode 710. Cathode 750 may include an active material layer 770 and a separator layer 760, with active material layer 770 including a plurality of active material particles 772 adhered together by a first binder, and separator layer 760 including a plurality of inorganic and/or ceramic particles 762 adhered together by a second binder. In some examples, cathode 750 may further include a second active material layer disposed between active material layer 770 and separator layer 760. In some examples, the first and second active material layers may include an interlocking region disposed between them. The interlocking region may be substantially identical to interlocking region 310 described above. Cathode active particles 772 may comprise transition metals (for example, nickel, cobalt, manganese, copper, zinc, vanadium, chromium, iron), and/or their oxides, phosphates, phosphites, and/or silicates. In some examples, the cathode active material particles may include alkalines and alkaline earth metals, aluminum, aluminum oxides and aluminum phosphates, halides and/or chalcogenides.

Ceramic particles 762 may comprise any suitable inorganic material or materials, including ceramics such as aluminum oxide (i.e., alumina ($\alpha$-$Al_2O_3$)), corundum, calcined, tabular, synthetic boehmite, silicon oxides or silica, zirconia, and/or the like. Ceramic particles 762 may be electrically non-conductive. In some examples, ceramic particles 762 may have a D50 between 100 nm and 10 µm. In some examples, ceramic particles 722 and ceramic particles 762 may have different D50s. In some examples, ceramic particles 722 may have a greater D50 than ceramic particles 762. In some examples, ceramic particles 762 may have a greater D50 than ceramic particles 722.

An interlocking region 780 may be disposed between active material layer 770 and separator layer 760. Interlocking region 780 may be substantially identical to interlocking region 210 of illustrative electrode 200, described above. Cathode 750 may be optionally calendered to provide a flat surface at a bottom surface 764 of separator layer 760. Bottom surface 764 may contact top surface 724 of anode 710, resulting in two ceramic separator layers having calendered surfaces disposed between them.

A second current collector 752 is disposed on and in contact with cathode 750. Second current collector 752 may include metal foils such as aluminum and/or any suitable substrate and may be electrically coupled to cathode 750.

Figure 9:
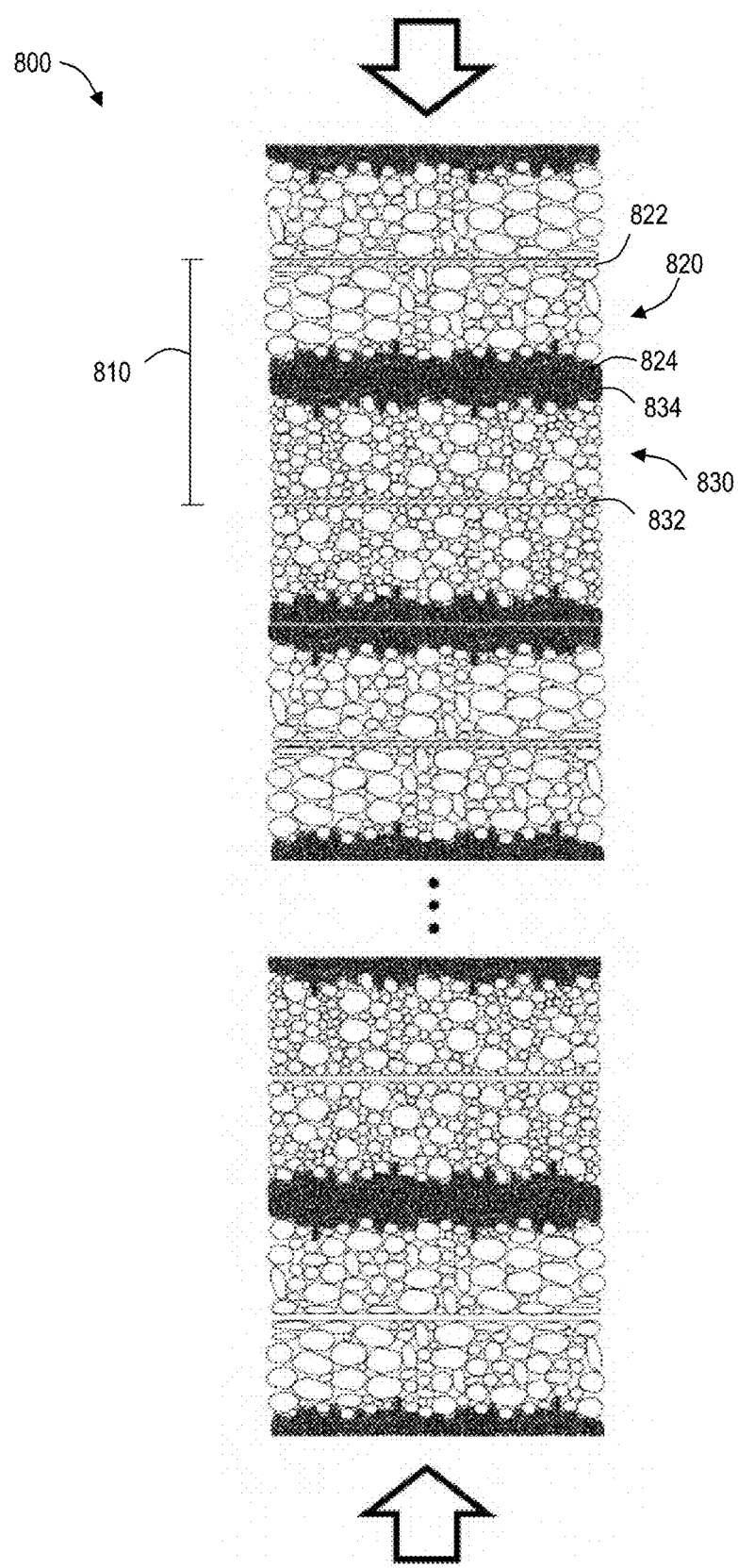
FIG. 9 is a partial sectional view of an illustrative electrochemical cell stack including multiple electrochemical cells having integrated ceramic separators.

In some examples, an electrochemical cell similar to electrochemical cell 700 may be included in a cell stack, such as those found in stacked cell lithium-ion batteries, wound cell lithium-ion batteries, or pouch cell lithium-ion batteries. FIG. 9 shows a cell stack 800 including a plurality of electrochemical cells, which may be substantially identical to electrochemical cells 700, and which may be cathodes and/or anodes. Adjacent anodes 820 and cathodes 830 of electrochemical cells 810 included in the cell stack may share anode current collectors 822 and cathode current collectors 832. Each anode 820 and cathode 830 may include an integrated ceramic separator layer 824 and 834. Individual electrochemical cells may be optionally calendered prior to cell stack assembly.

In some examples, cell stack 800 (as a whole) may be calendered or otherwise have a compressive force applied to the entire cell stack prior to insertion into a can (e.g., for a wound cell) or pouch bag (e.g., for a pouch cell). This may facilitate a desired level of densification of the cell stack, improving overall impedance of the electrochemical device while improving manufacturing speed, ease, and yield. This compressive force applied to the entire cell stack may additionally cause adjacent integrated separator layers included in anodes 820 and cathodes 830 to merge and become indistinguishable, further reducing cell impedance by eliminating "crust" found at interfaces between the separator layers. Electrochemical cells 810 included in cell stack 800 may include one or more features intended to reduce cell shorting, such as tabs protruding from current collectors, thicker separator layers at ends of electrodes, and tape applied to electrode edges.

E. Illustrative Electrode Manufacturing Method

The following describes steps of an illustrative method 900 for forming an electrode including an integrated separator layer; see FIGS. 10-14.

Aspects of electrodes and manufacturing devices described herein may be utilized in the method steps described below. Where appropriate, reference may be made to components and systems that may be used in carrying out each step. These references are for illustration, and are not intended to limit the possible ways of carrying out any particular step of the method.

Figure 10:
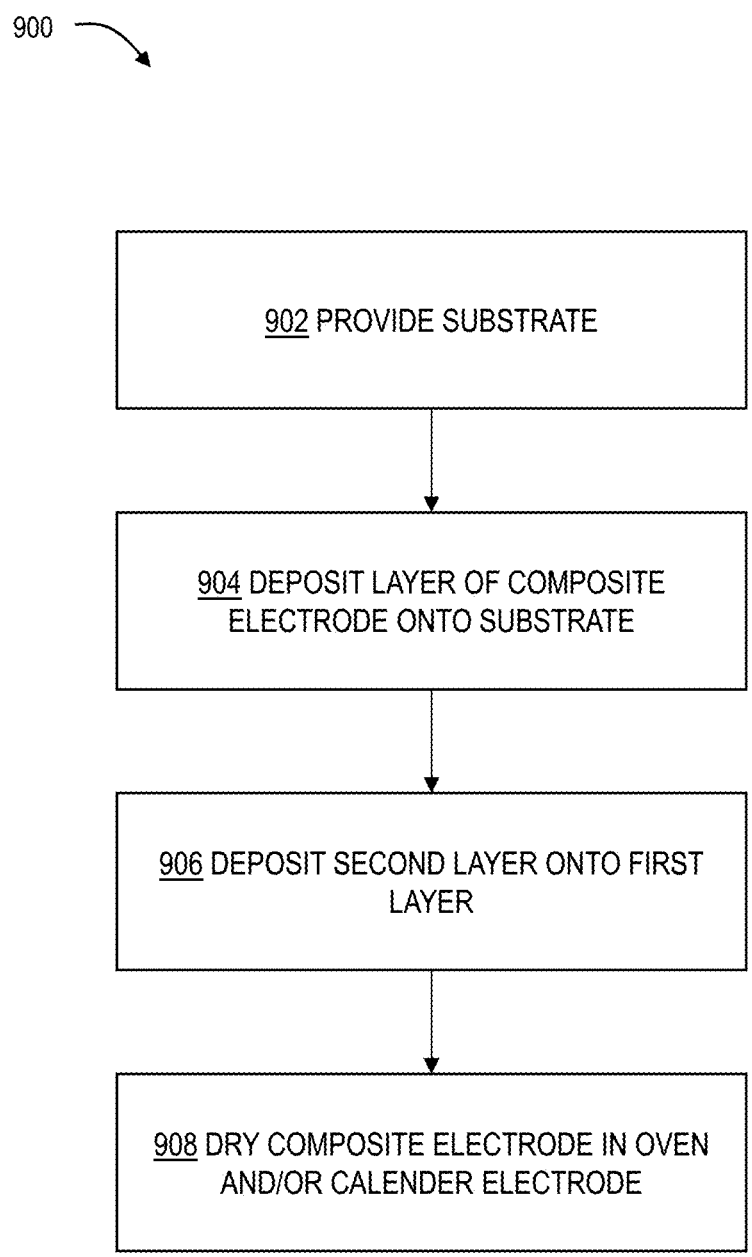
FIG. 10 is a flow chart depicting steps of an illustrative method for manufacturing an electrode including an integrated ceramic separator according to the present teachings.

FIG. 10 is a flowchart illustrating steps performed in an illustrative method, and may not recite the complete process or all steps of the method. Although various steps of method 900 are described below and depicted in FIG. 10, the steps need not necessarily all be performed, and in some cases may be performed simultaneously, or in a different order than the order shown.

Step 902 of method 900 includes providing a substrate, wherein the substrate includes any suitable structure and material configured to function as a conductor in a secondary battery of the type described herein. In some examples, the substrate comprises a current collector. In some examples, the substrate comprises a metal foil. The term "providing" here may include receiving, obtaining, purchasing, manufacturing, generating, processing, preprocessing, and/or the like, such that the substrate is in a state and configuration for the following steps to be carried out.

Method 900 next includes a plurality of steps in which at least a portion of the substrate is coated with an electrode material composite. This may be done by causing a current collector substrate and an electrode material composite dispenser to move relative to each other, by causing the substrate to move past an electrode material composite dispenser (or vice versa) that coats the substrate as described below. The composition of material particles in each electrode material composite layer may be selected to achieve the benefits, characteristics, and results described herein. The electrode material composite may include one or more electrode layers, including a plurality of active material particles, and one or more separator layers, each including a plurality of inorganic material particles.

Figure 11:
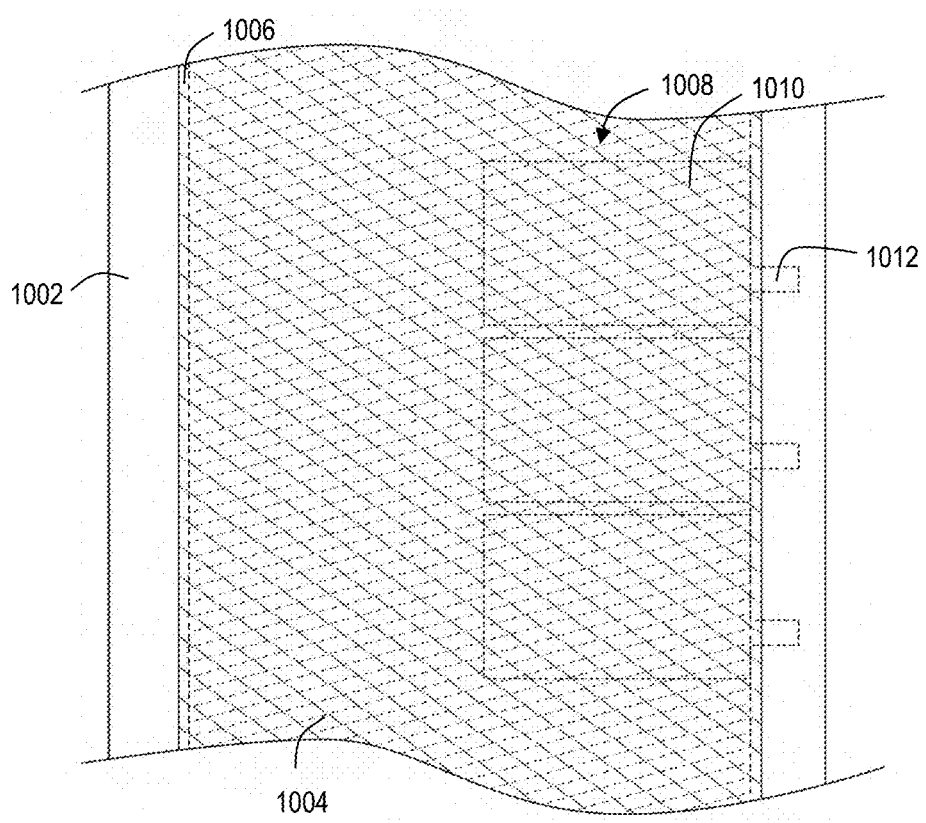
FIG. 11 depicts an example of an electrode material composite on a substrate web, prior to blanking.
Figure 12:
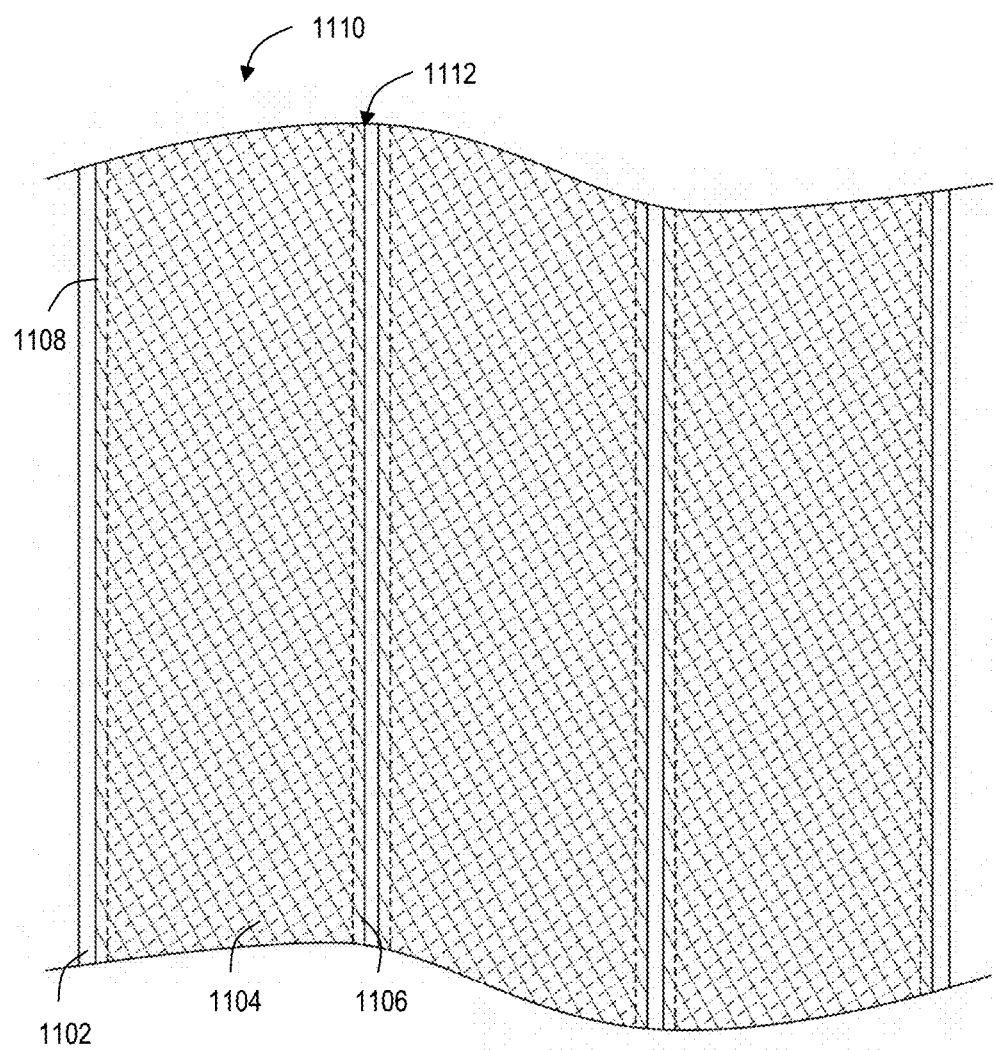
FIG. 12 depicts an example of an electrode material composite on a substrate web configured in lanes.
Figure 13:
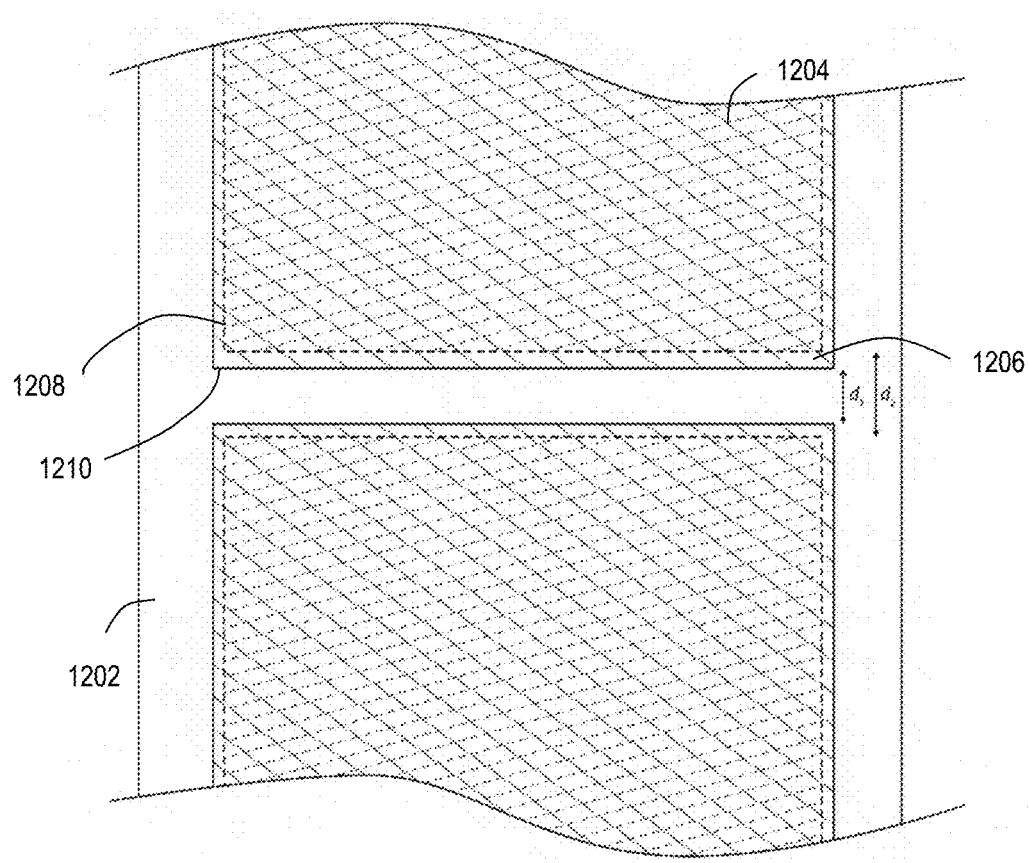
FIG. 13 depicts an example of an electrode material composite implemented with a skip coating manufacturing process.

FIGS. 11-13 depict electrode layers and a separator layer formed on a substrate in various illustrative configurations, depicting how a manufactured electrode may be arranged on a web as a function of relative motion between the current collector substrate and the electrode material composite dispenser.

FIG. 11 depicts a substrate web 1002 having an electrode layer 1004 applied directly to the substrate web and a separator layer 1006 disposed on top of the electrode layer. The electrode layer may comprise one active material layer or two or more active material layers. The layers disposed on the substrate in this manner facilitate electrode blanking, in which the conductive substrate, electrode layer, and separator layer may be cut from the web in one piece. An electrode cut in this embodiment of the manufacturing method may have a shape 1008, including an electrode body 1010 and tab 1012. This may allow for a simpler manufacturing process and further reduce cost of manufacturing electrodes.

FIG. 12 is an example of how a similar concept can be utilized to coat multiple lanes simultaneously. A multiple lane configuration may be used for blanking electrodes for use in pouch cells as well as for use in wound cells wherein a foil region is left unslit for tabbing. This configuration may be suitable for high-power applications. In this embodiment, substrate web 1102 may have electrode layer 1104 applied directly to the substrate web and a separator layer 1106 disposed on top of the electrode layer. The electrode layer may comprise one active material layer or two or more active material layers. In this embodiment, electrode body 1110 may have a shape 1108, which is defined by an edge 1112 of the separator layer 1106.

FIG. 13 further depicts how a "skip coating" method of manufacture may be implemented. In this embodiment, an electrode layer 1204 may be applied to a substrate web 1202 so that electrode layer 1204 has a first shape 1208. A separator layer 1206 may be applied on a top surface of electrode layer 1204 so that separator layer 1206 has a second shape 1210. First shape 1208 of electrode layer 1204 may have a first width and a first length. Second shape 1210 of separator layer 1206 may have a second width greater than the first width and a second length greater than the first length. During manufacture, this may be implemented by terminating coating of the separator layer later and initiating coating of the separator layer earlier than the coating of the active electrode layer. This ensures the outside edges of the active material layers are fully covered by the separator layer prior to electrode blanking.

Step 904 of method 900 includes coating a first layer of a composite electrode on a first side of the substrate. In some examples, the first layer may include a plurality of first particles adhered together by a first binder, the first particles having a first average particle size (or other first particle distribution). In some examples, the plurality of first particles may comprise a plurality of first active material particles. In some examples, the composite electrode is an anode suitable for inclusion within an electrochemical cell. In this case, the first particles may comprise graphite (artificial or natural), hard carbon, titanate, titania, transition metals in general, elements in group 14 (e.g., carbon, silicon, tin, germanium, etc.), oxides, sulfides, transition metals, halides, and/or chalcogenides. In some examples, the composite electrode is a cathode suitable for inclusion within an electrochemical cell. In this case, the first particles may comprise transition metals (for example, nickel, cobalt, manganese, copper, zinc, vanadium, chromium, iron), and/or their oxides, phosphates, phosphites, and/or silicates. In some examples, the cathode active material particles may include alkalines and alkaline earth metals, aluminum, aluminum oxides and aluminum phosphates, halides, and/or chalcogenides.

The coating process of step 904 may include any suitable coating method(s), such as slot die, blade coating, spray-based coating, electrostatic jet coating, or the like. In some examples, the first layer is coated as a wet slurry of solvent, e.g., water or NMP (N-Methyl-2-pyrrolidone), binder, conductive additive, and active material. In some examples, the first layer is coated dry, as an active material with a binder and/or a conductive additive. Step 904 may optionally include drying the first layer of the composite electrode.

Step 906 of method 900 includes coating a second layer onto the first layer, forming a multilayered (e.g., stratified) structure. The second layer may include a plurality of second particles adhered together by a second binder, the second particles having a second average particle size (or other second particle distribution). In this example, the second layer comprises particles configured to function as a separator for the electrode. For example, the second layer may comprise ceramic particles, such as aluminum oxide (i.e., alumina ($\alpha$-$Al_2O_3$)), corundum, calcined, tabular, synthetic boehmite, silicon oxides or silica, zirconia, and/or the like.

In some examples, steps 904 and 906 may be performed substantially simultaneously. For example, both of the slurries may be extruded through their respective orifices simultaneously. This forms a two-layer slurry bead and coating on the moving substrate. In some examples, difference in viscosities, difference in surface tensions, difference in densities, difference in solids contents, and/or different solvents used between the first active material slurry and the second separator slurry may be tailored to cause interpenetrating finger structures at the boundary between the two composite layers. In some embodiments, the viscosities, surface tensions, densities, solids contents, and/or solvents may be substantially similar. Creation of interpenetrating structures, if desired, may be facilitated by turbulent flow at the wet interface between the first active material slurry and the second separator slurry, creating partial intermixing of the two slurries.

To facilitate proper curing in the drying process, the first layer (closest to the current collector) may be configured (in some examples) to be dried from solvent prior to the second layer (further from the current collector) so as to avoid creating skin-over effects and blisters in the resulting dried coatings.

In some examples, any of the described steps may be repeated to form three or more layers. For example, an additional layer or layers may include active materials to form a multilayered electrode structure before adding the separator layer. Any method described herein to impart structure between the first active material layer and the separator coating may be utilized to form similar structures between any additional layers deposited during the manufacturing process. In some examples, a first composite electrode layer, a second composite electrode layer, and a third composite electrode layer may be extruded simultaneously. The first composite electrode layer and the second composite electrode layer may comprise first and second active material particles, while the third composite electrode layer may comprise ceramic separator particles, such as in an integrated separator layer. Simultaneous extrusion of three slurries may form a three-layer slurry bead on the moving substrate. Interpenetrating finger structures may form at a boundary between the first composite electrode layer and the second composite electrode layer, as well as between the second composite electrode layer and the third composite electrode layer.

Method 900 may further include drying the composite electrode in step 408, and/or calendering the composite electrode. Both the first and second layers may experience the drying process and the calendering process as a combined structure. In some examples, step 908 may be combined with calendering (e.g., in a hot roll process). In some examples, drying step 908 includes a form of heating and energy transport to and from the electrode (e.g., convection, conduction, radiation) to expedite the drying process. In some examples, calendering is replaced with another compression, pressing, or compaction process. In some examples, calendering the electrode may be performed by pressing the combined first and second layers against the substrate, such that electrode density is increased in a non-uniform manner, with the first layer having a first porosity and the second layer having a lower second porosity.

Figure 14:
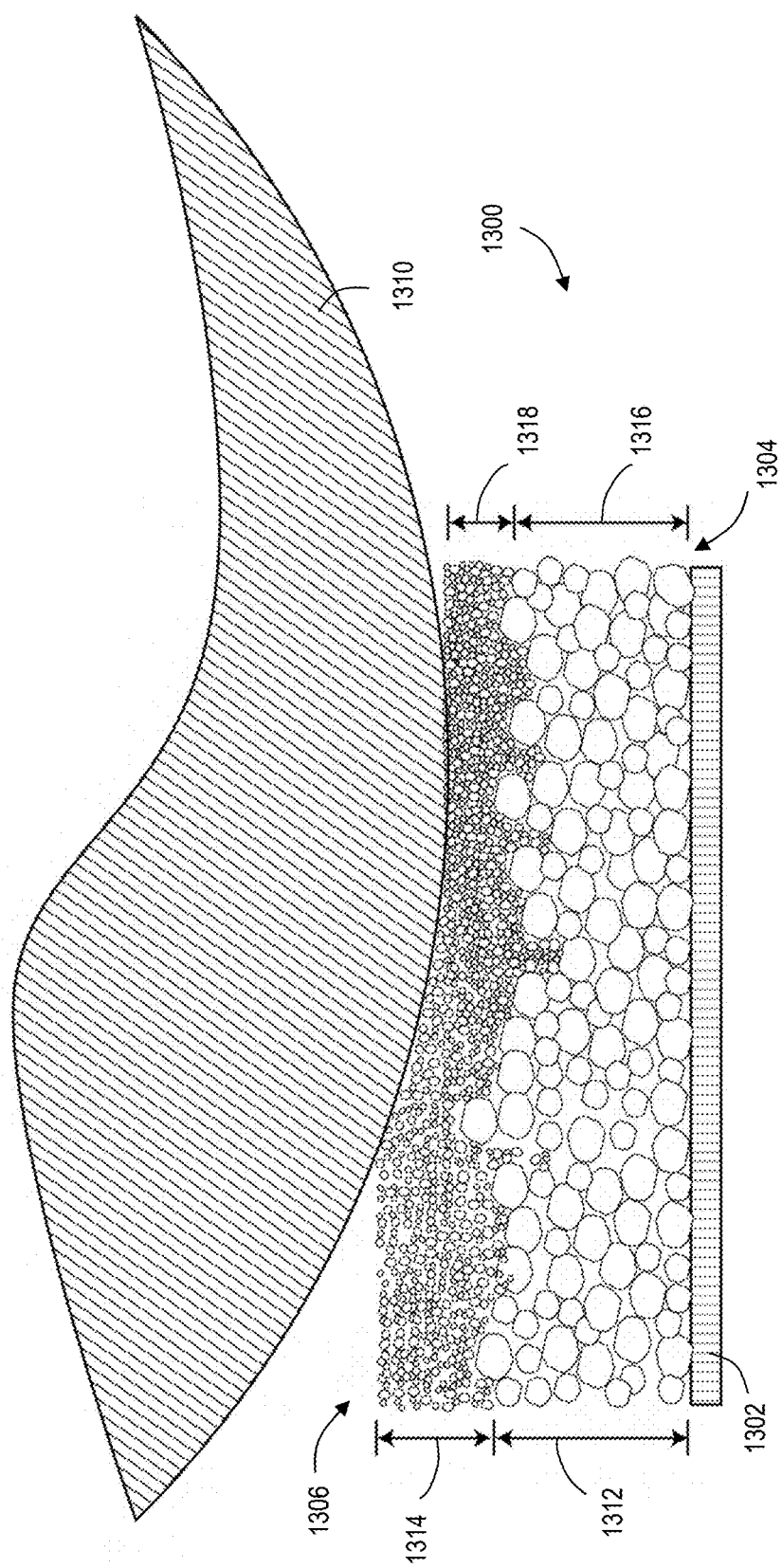
FIG. 14 is a sectional view of an illustrative electrode undergoing a calendering process in accordance with aspects of the present disclosure.

FIG. 14 shows an electrode undergoing the calendering process, in which particles in a second layer 1306 (AKA the separator layer) can be calendered with a first layer 1304 (AKA the active material layer). This may prevent a "crust" formation on the electrode, specifically on the active material layer. A roller 1310 may apply pressure to a fully assembled electrode 1300. Electrode 1300 may include first layer 1304 and second layer 1306 applied to a substrate web 1302. First layer 1304 may have a first uncompressed thickness 1312 and second layer 1306 may have a second uncompressed thickness 1314 prior to calendering. After the electrode has been calendered, first layer 1304 may have a first compressed thickness 1316 and second layer 1306 may have a second compressed thickness 1318. In some embodiments, second layer 1306 may have a greater resistance to densification and a lower compressibility than first layer 1304. After a certain level of densification, a higher tolerance to bulk compression of the separator layer may transfer a load to the more compressible electrode layer below. This process may effectively densify the electrode without over densifying the separator layer.

F. Illustrative Electrode Manufacturing System

Figure 15:
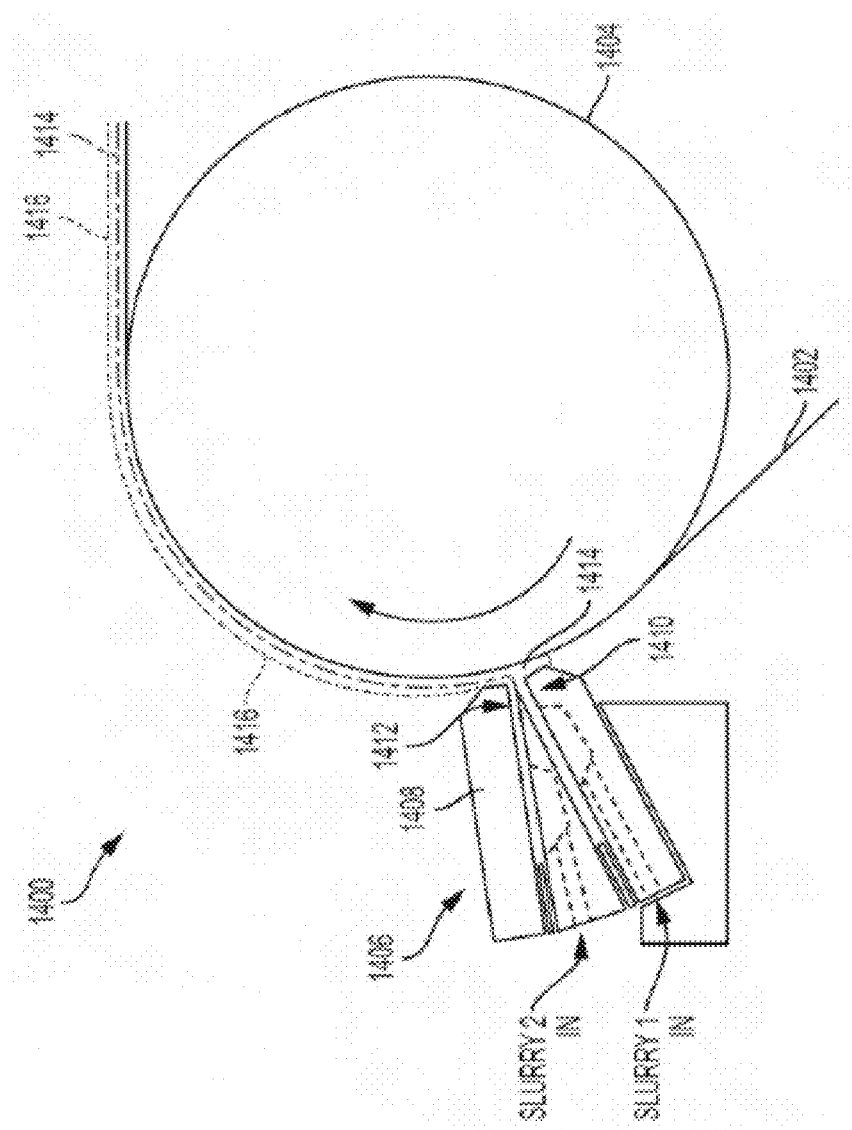
FIG. 15 is a schematic diagram of an illustrative manufacturing system suitable for manufacturing electrodes and electrochemical cells of the present disclosure.

Turning to FIG. 15, an illustrative manufacturing system 1400 for use with method 900 will now be described. In some examples, a slot-die coating head with at least two fluid slots, fluid cavities, fluid lines, and fluid pumps may be used to manufacture a battery electrode featuring an active material layer and an integrated separator layer (AKA a separator coating). In some examples, additional cavities may be used to create additional active material layers (e.g., in an electrochemical cell including two active material layers and one integrated separator layer).

In system 1400, a foil substrate 1402 is transported by a revolving backing roll 1404 past a stationary dispenser device 1406. Dispenser device 1406 may include any suitable dispenser configured to evenly coat one or more layers of slurry onto the substrate. In some examples, the substrate may be held stationary while the dispenser head moves. In some examples, both may be in motion. Dispenser device 1406 may, for example, include a dual chamber slot die coating device having a coating head 1408 with two orifices 1410 and 1412. A slurry delivery system may supply two different slurries to the coating head under pressure. Due to the revolving nature of backing roll 1404, material exiting the lower orifice or slot 1410 will contact substrate 1402 before material exiting the upper orifice or slot 1412. Accordingly, a first layer 1414 will be applied to the substrate and a second layer 1416 will be applied on top of the first layer. In the present disclosure, the first layer 1414 may be the active material of an electrode and the second layer may be a separator layer.

Manufacturing method 900 may be performed using a dual-slot configuration, as described above, to simultaneously extrude the electrode material and the separator layers, or a multi-slot configuration with three or more dispensing orifices used to simultaneously extrude a multilayered electrode with an integrated separator layer. In some embodiments, manufacturing system 1400 may include a tri-slot configuration, such that a first active material layer, a second active material layer, and the separator layer may all be extruded simultaneously. In another embodiment, the separator layer may be applied after the electrode (single layered or multilayered) has first dried.

G. Illustrative Electrochemical Cell Manufacturing Method

Figure 16:
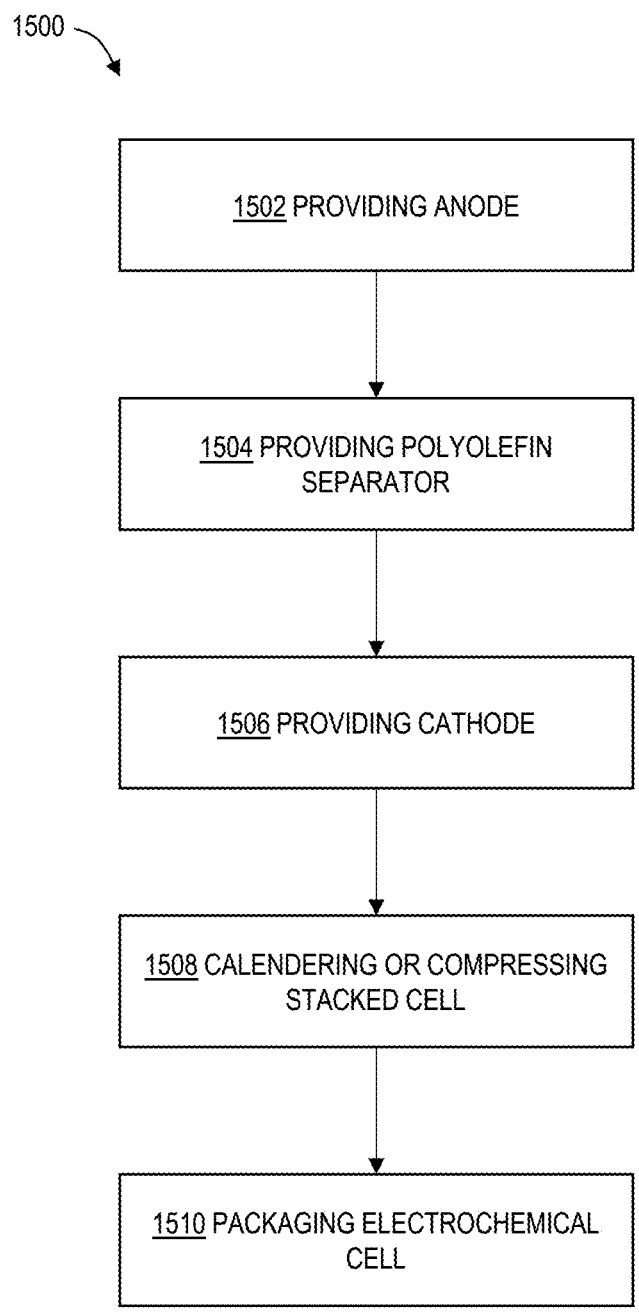
FIG. 16 is a flow chart depicting steps of an illustrative method for manufacturing an electrochemical cell including an integrated ceramic separator according to the present teachings.

This section describes steps of an illustrative method 1500 for manufacturing electrochemical cells including integrated ceramic separators; see FIG. 16. Aspects of electrodes including integrated ceramic separators, electrochemical cells including integrated ceramic separators, and/or systems and methods for manufacturing electrodes including integrated ceramic separators as described above may be utilized in the method steps described below. Where appropriate, reference may be made to components and systems that may be used in carrying out each step. These references are for illustration, and are not intended to limit the possible ways of carrying out any particular step of the method.

FIG. 16 is a flowchart illustrating steps performed in an illustrative method, and may not recite the complete process or all steps of the method. Although various steps of method 1500 are described below and depicted in FIG. 16, the steps need not necessarily all be performed, and in some cases may be performed simultaneously or in a different order than the order shown.

Step 1502 of method 1500 includes providing an anode or negative electrode for use in an electrochemical cell. Providing an anode may include manufacturing an anode including an integrated ceramic separator, as described above in method 900. In some examples, providing an anode may include providing a previously manufactured anode. In some examples, providing an anode includes calendering the anode to produce a flat top surface of the ceramic separator layer and/or active layer.

Step 1504 of method 1500 includes optionally disposing a polyolefin separator on the ceramic separator of the anode. The polyolefin separator may be substantially identical to polyolefin separators described above. In some examples, the polyolefin separator may comprise thermoplastic polyolefins, such as polyethylene and/or polypropylene. In some examples, the polyolefin separator may have a thickness less than 20 µm. In some examples, the polyolefin separator may have a thickness less than 10 µm. Providing the polyolefin separator may include placing the polyolefin separator between the cathode and anode, so as to act as an additional source of separation between the two electrodes and to act as a thermal shutoff mechanism. In some examples, step 1504 includes placing the polyolefin separator on a top surface of the anode. In some examples, step 1504 is omitted to produce an electrochemical cell having low impedance when compared with an electrochemical cell including a polyolefin separator.

Step 1506 of method 1500 includes providing a cathode or positive electrode for use in an electrochemical cell. Providing a cathode may include manufacturing a cathode including an integrated ceramic separator, as described above in method 900. In some examples, providing a cathode may include providing a previously manufactured cathode. In some examples, providing a cathode includes calendering the cathode to produce a flat bottom surface of the ceramic separator layer and/or active layer.

One or both of the anode provided in step 1502 and the cathode provided in step 1506 is an electrode including in integrated ceramic separator, as described above. The anode or the cathode may be substantially identical to single-layer electrode 200 or multilayered electrode 300. In some examples, one of the anode and the cathode may not include an integrated ceramic separator. In some examples, at least one of the anode and the cathode may be a multilayered electrode.

Providing a cathode may further include placing the cathode on a top surface of the anode or vice versa. In some examples, the cathode may be placed such that a ceramic separator layer included in the cathode contacts a ceramic separator layer included in the anode. In some examples, the cathode may be placed such that a ceramic separator layer included in the cathode contacts a top surface of the anode active material composite. In some examples, the cathode may be placed such that a bottom surface of the cathode active material composite contacts a ceramic separator layer included in the cathode. In some examples, providing a cathode may include placing the cathode on a top surface of a polyolefin separator such that the polyolefin separator is disposed between the cathode and anode.

Step 1508 of method 1500 includes optionally calendering or compressing a stacked cell including a plurality of stacked electrodes and/or electrochemical cells. In some examples, steps 1502 and 1506 may be repeated to produce a stacked electrochemical cell, such as cell stack 800, described above. Calendering or compressing the cell may include calendering the cell using a roller, as shown in FIG. 14, applying pressure using a press, and/or any suitable method for applying a compressive force on the entire cell stack. This may achieve a desired degree of densification within the cell, improving cell impedance characteristics. Compressing a cell stack including directly adjacent ceramic separator layers may cause the layers to become indistinguishable, further improving cell impedance.

Step 1510 of method 1500 includes optionally packaging the electrochemical cell. Packaging the electrochemical cell may include inserting the cell into a can, as with a wound cell, inserting the cell into a pouch bag, as with a pouch cell, and/or any other suitable method of packaging an electrochemical cell such as a lithium-ion battery.

In some examples, an illustrative method of manufacturing an electrochemical cell according to the current disclosure includes manufacturing a first electrode, wherein manufacturing the first electrode includes layering a first active material layer onto a first current collector substrate, the first active material layer including a plurality of first active material particles. A first integrated separator layer is layered onto the first active material layer, the first integrated separator layer including a plurality of first ceramic separator particles, such that a first interlocking region is formed between the first active material layer and the first separator layer. The first interlocking region comprises a non-planar interpenetration of first fingers of the first active material layer and second fingers of the first integrated separator layer. Manufacturing a second electrode includes layering a second active material layer onto a second current collector substrate, the second active material layer including a plurality of second active material particles. The first electrode is placed onto the second electrode such that the first integrated separator layer is adjacent to the second active material layer.

Another illustrative manufacturing method is laid out below, in the form of related paragraphs. Aspects of the manufacturing systems and methods described above may be utilized to carry out steps of the following method:

D0. A method of manufacturing an electrochemical cell, the method comprising:

manufacturing a first electrode, wherein manufacturing the first electrode includes:

layering a first active material layer onto a first current collector substrate, the first active material layer including a plurality of first active material particles; and layering a first integrated separator layer onto the first active material layer, the first integrated separator layer including a plurality of first ceramic separator particles, such that a first interlocking region is formed between the first active material layer and the first separator layer;

wherein the first interlocking region comprises a non-planar interpenetration of first fingers of the first active material layer and second fingers of the first integrated separator layer; and manufacturing a second electrode, wherein manufacturing the second electrode includes:

layering a second active material layer onto a second current collector substrate, the second active material layer including a plurality of second active material particles; and placing the first electrode onto the second electrode such that the first integrated separator layer is adjacent to the second active material layer.

D1. The method of D0, further including inserting a polyolefin separator between the first integrated separator layer and the second active material layer.

D2. The method of D0 or D1, further including layering a second integrated separator layer onto the second active material layer.

D3. The method of D2, wherein the second integrated separator layer includes a plurality of second ceramic separator particles.

D4. The method of D2 or D3, further including calendering the electrochemical cell such that the first integrated separator layer and the second integrated separator layer merge and become indistinguishable from each other.

D5. The method of any of D0 through D4, further including packaging the cell.

H. Illustrative Electrochemical Bilayer Cells with Integrated Separator

Figure 17:
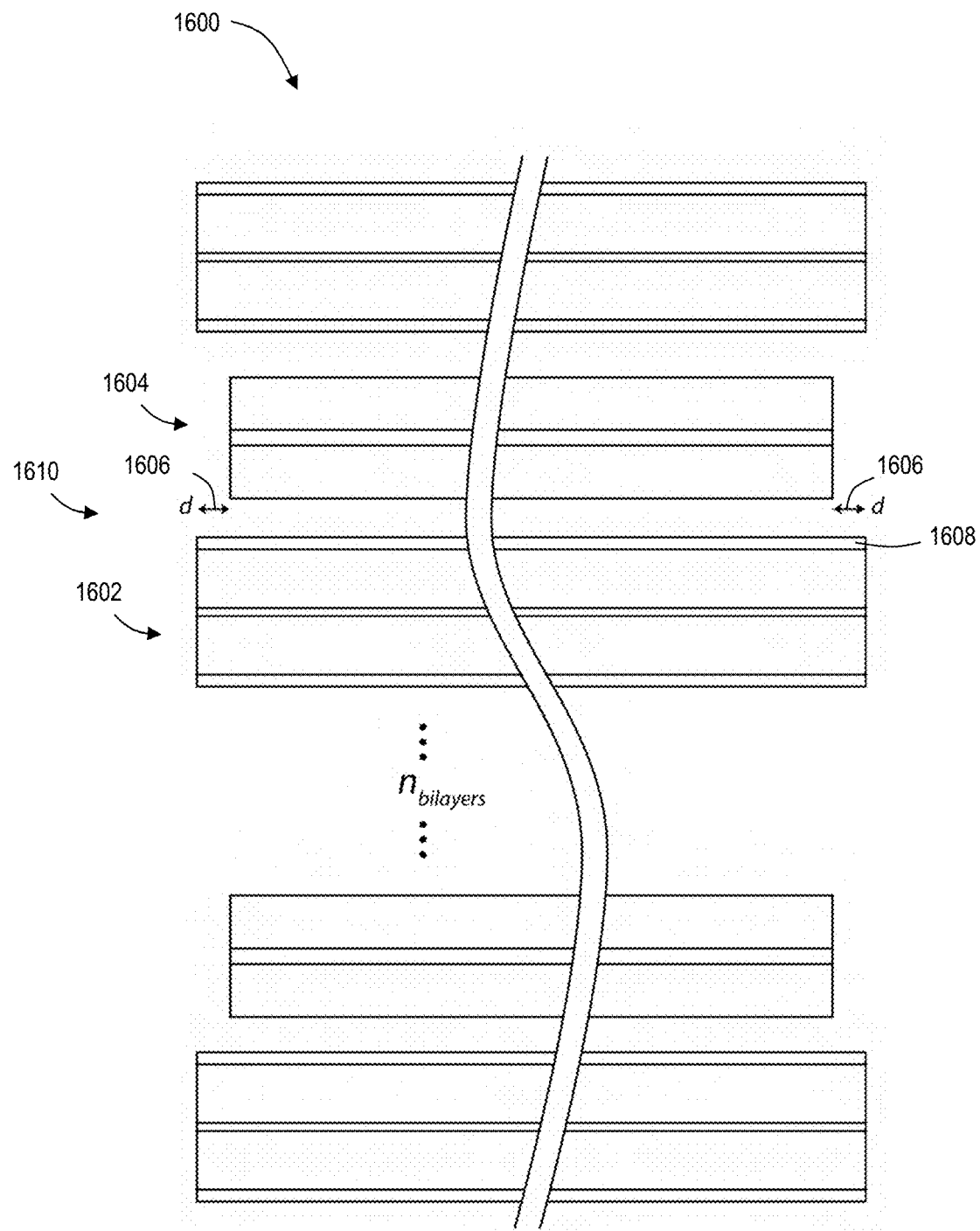
FIG. 17 is a schematic diagram of an illustrative stacked cell format in accordance with aspects of the present disclosure.
Figure 18:
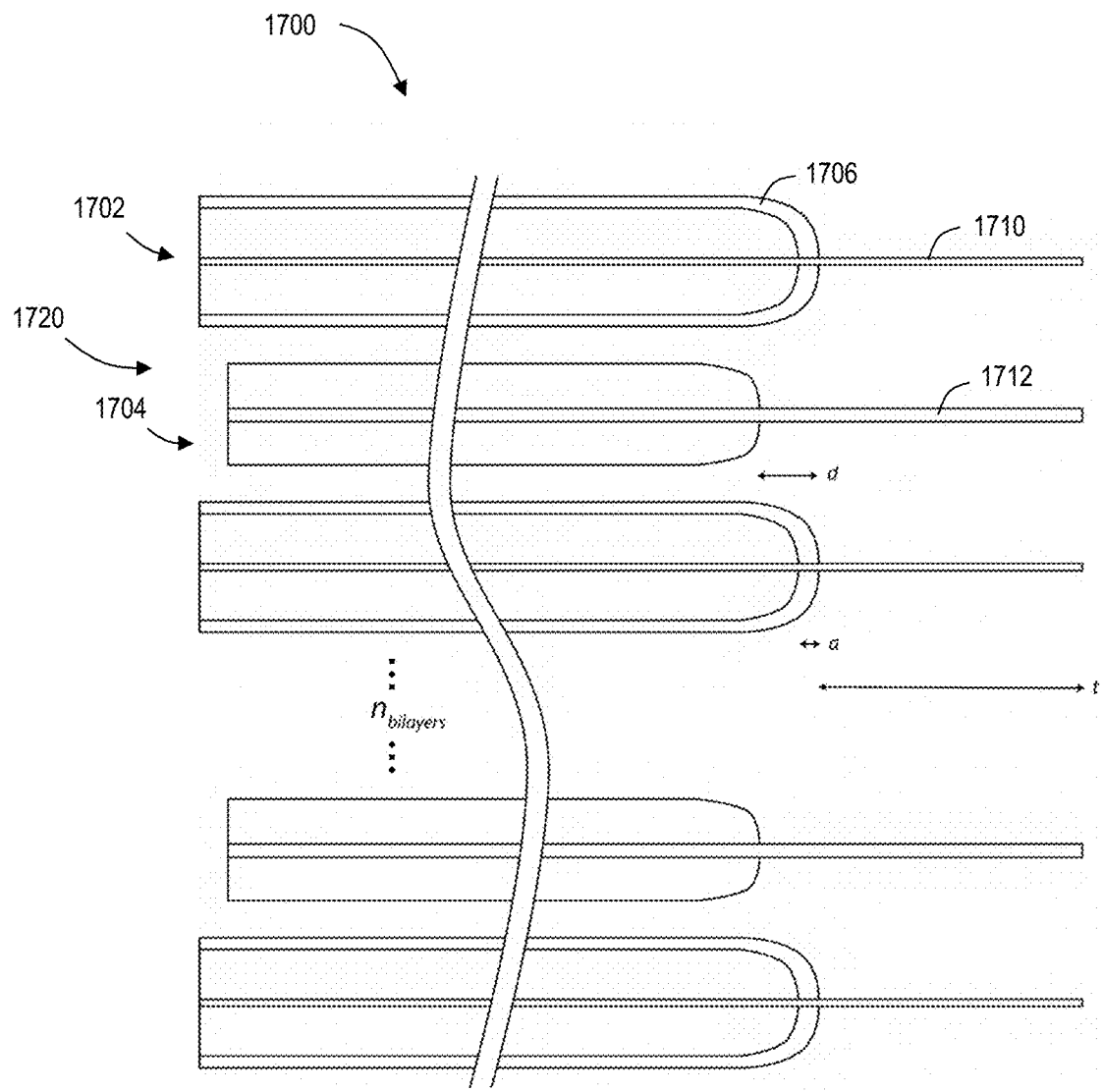
FIG. 18 is a schematic diagram of an illustrative stacked cell format with protruding tabs, in accordance with aspects of the present disclosure.
Figure 19:
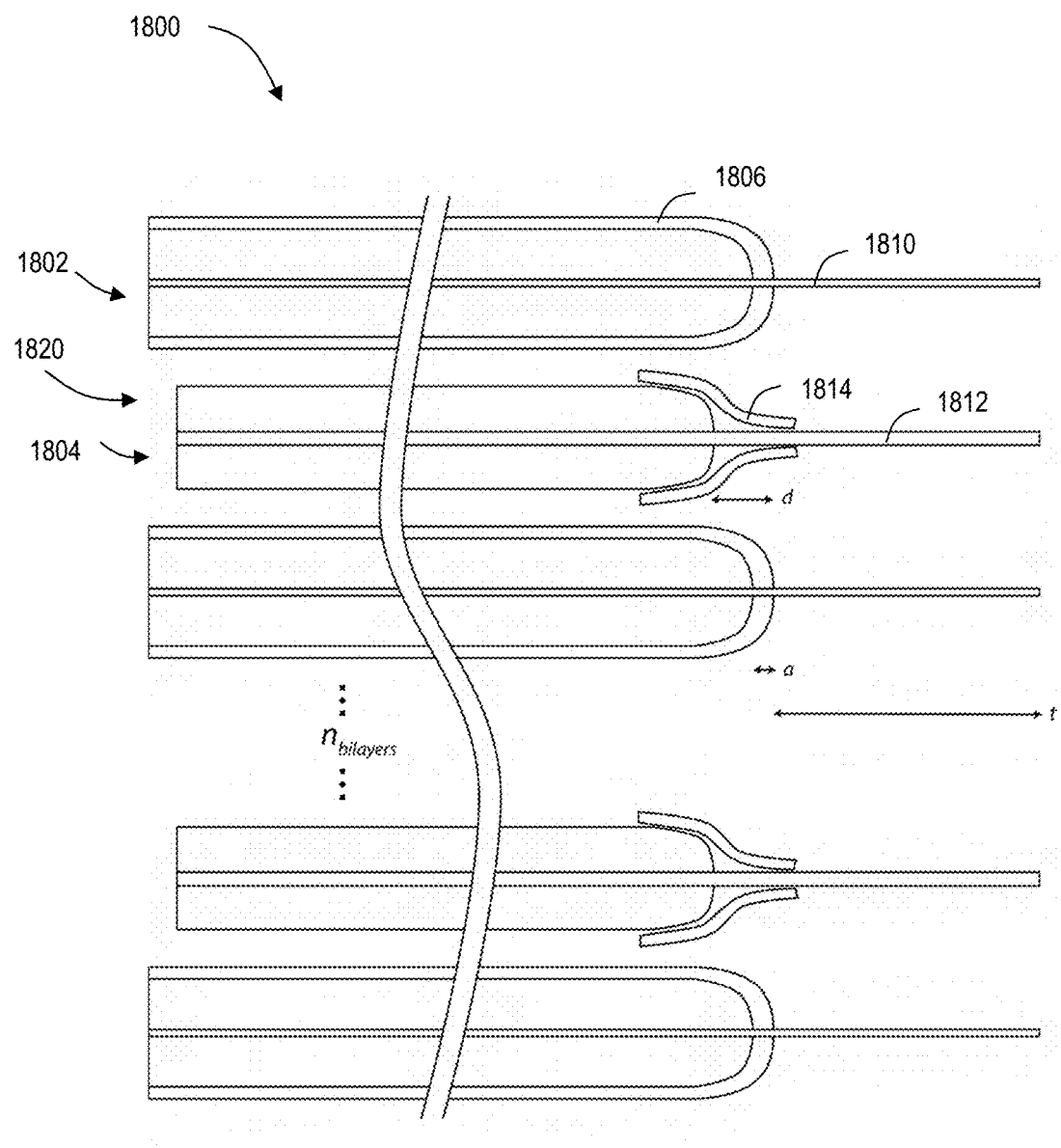
FIG. 19 is a schematic diagram of an illustrative stacked cell format with tape applied to cathode layers, in accordance with aspects of the present disclosure.

FIGS. 17, 18, and 19 depict examples of electrochemical bilayer cells including electrodes with integrated separators. Aspects of electrodes and manufacturing devices described herein may be utilized as components of the electrochemical bilayer cells described below. Electrochemical bilayer cells described below may be examples of cell stacks, such as cell stack 800 described above. Electrochemical bilayer cells described below may be manufactured using steps of illustrative method 1500, especially as described in step 1508.

FIG. 17 depicts an example of a stacked cell configuration 1600. A bilayer cell 1610 may be formed by two electrodes (e.g., an anode 1602 and a cathode 1604). One or both of anode 1602 and cathode 1604 may be multi-layered, similar to electrode 300 of FIG. 4. Depending on the application, a plurality of bilayer cells may be configured to form the stacked cells. In some embodiments, a first and last electrode in a cell including n electrodes may be anodes 1602. In a stacked cell format 1600, anode 1602 may be configured to be longer than cathode 1604 by a distance 1606. Distance 1606 may be such that the distal ends of anode 1602 extend further than the distal ends of cathode 1604. The increased length of the anode may help prevent shorting between the two electrodes. In the present example, anode 1602 may include an integrated separator layer 1608. A similar configuration may be used for wound cells. In the case of wound cells, a single bilayer cell is formed using any of the methods described herein, after which the bilayer cell is wound or rolled.

FIG. 18 shows a stacked cell configuration 1700 having tabs 1710 and 1712 protruding from an anode 1702 and a cathode 1704 respectively, in a bilayer cell 1720. One or both of anode 1702 and cathode 1704 may be multi-layered, similar to electrode 300 of FIG. 4. Tab 1710, in the present example, may protrude from anode 1702, passing through electrode layer 1705 and separator layer 176. A thicker separator layer 1706 on the distal end of the electrode where the tab protrudes may prevent shorting between anode 1702 and cathode 1704.

FIG. 19 shows a stacked cell configuration 1800 having tabs 1810 and 1812 protruding from an anode 1802 and a cathode 1804 respectively, in a bilayer cell 1820. One or both of anode 1802 and cathode 1804 may be multi-layered, similar to electrode 300 of FIG. 4. Tab 1810, in the present example, may protrude from anode 1802, passing through electrode layer 1805 and separator layer 1806. A thicker separator layer 1806 on the distal end of the electrode where the tab protrudes may prevent shorting between anode 1802 and cathode 1804. Tape 1814 may be applied to cathode 1804 and tab 1812 at the distal end of the electrode, further adding insulation and preventing shorting between anode 1802 and cathode 1804.

I. Illustrative Combinations and Additional Examples

This section describes additional aspects and features of electrochemical cells including integrated ceramic separators, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. An electrochemical cell comprising:
a first electrode including:
a first current collector substrate,
a first active material layer disposed on (e.g., layered onto) the first current collector substrate, the first active material layer comprising a plurality of first active material particles,
a first integrated separator layer disposed on (e.g., layered onto) the first active material layer, the first integrated separator layer comprising a plurality of first ceramic separator particles,
a first interlocking region disposed between and coupling the first active material layer to the first separator layer, wherein the first interlocking region comprises a non-planar interpenetration of first fingers of the first active material layer and second fingers of the first integrated separator layer, and
a second electrode including:
a second current collector substrate,
a second active material layer disposed on (e.g., layered onto) the second current collector substrate, the second active material layer comprising a plurality of second active material particles,
a second integrated separator layer disposed on (e.g., layered onto) the second active material layer, the second integrated separator layer comprising a plurality of second ceramic separator particles, and
a second interlocking region disposed between and coupling the second active material layer to the second separator layer, wherein the second interlocking region comprises a non-planar interpenetration of third fingers of the second active material layer and fourth fingers of the second integrated separator layer; and
a polyolefin separator disposed between the first ceramic separator layer and the second ceramic separator layer.

A1. The electrochemical cell of A0, wherein the polyolefin separator comprises polyethylene.

A2. The electrochemical cell of A0 or A1, wherein the polyolefin separator comprises polypropylene.

A3. The electrochemical cell of any of A0 through A2, wherein the polyolefin separator has a thickness less than 10 μm.

A4. The electrochemical cell of any of A0 through A3, wherein the first ceramic separator particles have an average mass-median diameter between 100 nm and 10 μm.

A5. The electrochemical cell of any of A0 through A4, wherein the second ceramic separator particles have an average mass-median diameter between 100 nm and 10 μm.

A6. The electrochemical cell of any of A0 through A5, wherein the first ceramic separator particles comprise alumina.

A7. The electrochemical cell of any of A0 through A6, wherein the second ceramic separator particles comprise alumina.

A8. The electrochemical cell of any of A0 through A7, wherein the first electrode is an anode.

A9. The electrochemical cell of A8, wherein the first current collector comprises copper.

A10. The electrochemical cell of A8 or A9, wherein the second electrode is a cathode.

A11. The electrochemical cell of A10, wherein the second current collector comprises aluminum.

A12. The electrochemical cell of any of A0 through A11, wherein the first active material particles are adhered together by a first binder.

A13. The electrochemical cell of any of A0 through A12, wherein the first ceramic separator particles are adhered together by a second binder.

A14. The electrochemical cell of any of A0 through A13, wherein the second active material particles are adhered together by a third binder.

A15. The electrochemical cell of any of A0 through A14, wherein the second ceramic separator particles are adhered together by a fourth binder.

B0. An electrochemical cell comprising:
a first electrode including:
a first current collector substrate,
a first active material layer disposed on (e.g., layered onto) the first current collector substrate, the first active material layer comprising a plurality of first active material particles,
a first integrated separator layer disposed on (e.g., layered onto) the first active material layer, the first integrated separator layer comprising a plurality of first ceramic separator particles, and
a first interlocking region disposed between and coupling the first active material layer to the first separator layer, wherein the first interlocking region comprises a non-planar interpenetration of first fingers of the first active material layer and second fingers of the first integrated separator layer;
a second electrode; and
a polyolefin separator disposed between the first ceramic separator layer and the second electrode B1. The electrochemical cell of B0, wherein the polyolefin separator comprises polyethylene.

B2. The electrochemical cell of B0 or B1, wherein the polyolefin separator comprises polypropylene.

B3. The electrochemical cell of any of B0 through B2, wherein the polyolefin separator has a thickness less than 10 μm.

B4. The electrochemical cell of any of B0 through B3, wherein the first ceramic separator particles have an average mass-median diameter between 100 nm and 10 μm.

B5. The electrochemical cell of any of B0 through B4, wherein the first ceramic separator particles comprise alumina.

B6. The electrochemical cell of any of B0 through B5, wherein the first electrode is an anode.

B7. The electrochemical cell of B6, wherein the first current collector comprises copper.

B8. The electrochemical cell of B6, wherein the second electrode is a cathode.

B9. The electrochemical cell of B8, wherein the second current collector comprises aluminum.

B10. The electrochemical cell of any of B0 through B5, wherein the first electrode is a cathode.

B11. The electrochemical cell of B10, wherein the first current collector comprises aluminum.

B12. The electrochemical cell of B10, wherein the second electrode is an anode.

B13. The electrochemical cell of B12, wherein the second current collector comprises copper.

B14. The electrochemical cell of any of B0 through B13, wherein the first active material particles are adhered together by a first binder.

B15. The electrochemical cell of any of B0 through B14, wherein the first ceramic separator particles are adhered together by a second binder.

B16. The electrochemical cell of any of B0 through B15, wherein the second active material particles are adhered together by a third binder.

C0. An electrochemical cell comprising:
a first electrode including:
a first current collector substrate,
a first active material layer disposed on (e.g., layered onto) the first current collector substrate, the first active material layer comprising a plurality of first active material particles,
a first integrated separator layer disposed on (e.g., layered onto) the first active material layer, the first integrated separator layer comprising a plurality of first ceramic separator particles, and
a first interlocking region disposed between and coupling the first active material layer to the first separator layer, wherein the first interlocking region comprises a non-planar interpenetration of first fingers of the first active material layer and second fingers of the first integrated separator layer; and
a second electrode including:
a second current collector substrate,
a second active material layer disposed on (e.g., layered onto) the second current collector substrate, the second active material layer comprising a plurality of second active material particles,
a second integrated separator layer disposed on (e.g., layered onto) the second active material layer, the second integrated separator layer comprising a plurality of second ceramic separator particles, and
a second interlocking region disposed between and coupling the second active material layer to the second separator layer, wherein the second interlocking region comprises a non-planar interpenetration of third fingers of the second active material layer and fourth fingers of the second integrated separator layer;
wherein the first integrated separator layer is adjacent to and in direct contact with the second integrated separator layer.

C1. The electrochemical cell of C0, wherein the first ceramic separator particles have an average mass-median diameter between 100 nm and 10 μm.

C2. The electrochemical cell of C0 or C1, wherein the second ceramic separator particles have an average mass-median diameter between 100 nm and 10 μm.

C3. The electrochemical cell of any of C0 through C2, wherein the first ceramic separator particles comprise alumina.

C4. The electrochemical cell of any of C0 through C3, wherein the second ceramic separator particles comprise alumina.

C5. The electrochemical cell of any of C0 through C4, wherein the first electrode is an anode.

C6. The electrochemical cell of C5, wherein the first current collector comprises copper.

C7. The electrochemical cell of C5, wherein the second electrode is a cathode.

C8. The electrochemical cell of C7, wherein the second current collector comprises aluminum.

C9. The electrochemical cell of any of C0 through C8, wherein the first integrated separator and the second integrated separator layer are configured to merge and become indistinguishable from each other as a result of calendering of the electrochemical cell.

ADVANTAGES, FEATURES, AND BENEFITS

The different embodiments and examples of the electrochemical cell including integrated ceramic separator described herein provide several advantages over known electrochemical cells including separators. For example, illustrative embodiments and examples described herein provide stability at temperatures above a melting point of polypropylene as ceramic separator layers are not prone to melting at normal battery operating temperatures.

Additionally, and among other benefits, illustrative embodiments and examples described herein provide lower impedance as compared with known separators. Separators described herein are thinner than known separators having shutoff mechanisms, and do not have a crust-like surface layer between electrodes and separators.

Additionally, and among other benefits, illustrative embodiments and examples described herein facilitate the prevention of short circuiting within cells, as ceramic layers eliminate risks from shrinking and prevent lithium dendrite formation.

Additionally, and among other benefits, illustrative embodiments and examples described herein increase cell stability, as interpenetrating fingers between active material layers and ceramic separator layers in electrodes provide a robust interface. These interpenetrating fingers also reduce interfacial resistance at the electrode-separator interface.

Additionally, and among other benefits, illustrative embodiments and examples described herein decrease manufacturing costs, as integrated separator layers can be manufactured simultaneously with some electrodes, and cell stacks can be calendered simultaneously.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:
1. An electrochemical cell comprising:
a first electrode including:
a first current collector substrate,
a first active material layer layered onto the first current collector substrate, the first active material layer comprising a plurality of first active material particles having a first average particle size,
a first integrated separator layer layered onto the first active material layer, the first integrated separator layer comprising a plurality of first ceramic separator particles having a second average particle size, and a first interlocking region disposed between and coupling the first active material layer to the first separator layer, wherein the first interlocking region comprises a non-planar interpenetration of first fingers of the first active material layer three-dimensionally interdigitated with second fingers of the first integrated separator layer;

a second electrode; and a polyolefin separator disposed between the first integrated separator layer and the second electrode;

wherein a length of the first fingers is greater than twice the first average particle size or twice the second average particle size, whichever is smaller.

2. The electrochemical cell of claim 1, wherein the polyolefin separator comprises polyethylene.

3. The electrochemical cell of claim 1, wherein the polyolefin separator comprises polypropylene.

4. The electrochemical cell of claim 1, wherein the polyolefin separator has a thickness less than 10 μm.

5. The electrochemical cell of claim 1, wherein the first ceramic separator particles have an average mass-median diameter between 100 nm and 10 μm.

6. The electrochemical cell of claim 1, wherein the first ceramic separator particles comprise alumina.

7. The electrochemical cell of claim 1, wherein the first electrode is an anode.

8. The electrochemical cell of claim 1, wherein the first electrode is a cathode.

9. The electrochemical cell of claim 1, wherein the second electrode includes:

a second current collector substrate, a second active material layer disposed on the second current collector substrate, the second active material layer comprising a plurality of second active material particles having a third average particle size, a second integrated separator layer disposed on the second active material layer, the second integrated separator layer comprising a plurality of second ceramic separator particles having a fourth average particle size, and a second interlocking region disposed between and coupling the second active material layer to the second separator layer, wherein the second interlocking region comprises a non-planar interpenetration of third fingers of the second active material layer three-dimensionally interdigitated with fourth fingers of the second integrated separator layer; and wherein the polyolefin separator is disposed between the first integrated separator layer of the first electrode and the second integrated separator layer of the second electrode; and wherein a length of the third fingers is greater than twice the third average particle size or twice the fourth average particle size, whichever is smaller.

10. The electrochemical cell of claim 9, wherein the polyolefin separator comprises polyethylene.

11. The electrochemical cell of claim 9, wherein the polyolefin separator comprises polypropylene.

12. The electrochemical cell of claim 9, wherein the polyolefin separator has a thickness less than 10 μm.

13. The electrochemical cell of claim 9, wherein the first ceramic separator particles have an average diameter between 100 nm and 10 μm.

14. The electrochemical cell of claim 9, wherein the second ceramic separator particles have an average diameter between 100 nm and 10 μm.

* * * * *